United States Patent
Buhayar et al.

[15] 3,661,282
[45] May 9, 1972

[54] METHOD OF CONTINOUSLY MOVING CONTAINERS THROUGH A TREATMENT PROCESS

[72] Inventors: Eric S. Buhayar; James E. Hazard, both of Swarthmore; John J. Jaagus, Broomall; Fred W. Werner, Media; Robert W. Wheeler, Milmont Park, all of Pa.; Robert C. Crowe, Cherry Hill, N.J.

[73] Assignee: Scott Paper Company, Delaware, Pa.

[22] Filed: Mar. 4, 1970

[21] Appl. No.: 16,356

Related U.S. Application Data

[62] Division of Ser. No. 644,955, June 9, 1967, abandoned.

[52] U.S. Cl..............................214/152, 101/40, 214/1 BV
[51] Int. Cl..........................................................B66c 1/02
[58] Field of Search....................214/1 BV, 152; 101/39, 40, 101/124

[56] References Cited

UNITED STATES PATENTS 2,484,671  11/1949  Bauman..................................101/124
3,302,580  2/1967  Edwards..................................101/39

Primary Examiner—Gerald M. Forlenza
Assistant Examiner—George F. Abraham
Attorney—William J. Foley, Robert S. Bramson and John W. Kane, Jr.

[57] ABSTRACT

A method and apparatus is disclosed for printing on the sidewalls of containers such as cups having a generally circular cross-section and a cylindrical or frusto-conical shape. The apparatus is designed for continuous operation as distinguished from indexed operation. Methods and apparatus are disclosed which are used to accomplish certain portions of the over-all printing method, which form parts of the over-all printing apparatus, and which also have separate utility in other applications. Among these are a method and apparatus for individually separating and feeding containers from axially aligned or nested relationship in a stack, a turret assembly and a method for moving containers in supported condition through a treatment station, a print blanket assembly including a method and means for controllably pivoting the print blankets during printing, a method and apparatus for removing containers from an orbiting mandrel without contacting the printed sidewall, and a method and apparatus for drying decorating material on the sidewalls of printed containers.

The feeding apparatus employs several successive container conveying sections, two of which operate at an increased speed to separate containers from a line or stack and feed them to a remote position. The turret assembly comprises a rotatable frame carrying a plurality of rotatably mounted mandrels through an orbital path including a treatment section and includes a friction wheel for accelerating the mandrels to a given rotational velocity in a section of the orbital path prior to the treatment section. Cam means are provided to control the direction of tilt of the axis of each mandrel as it passes through the treatment section when the surfaces of hollow frusto-conical objects are to be treated. The printed blanket assembly includes apparatus for pivoting the print blankets during contact with the moving surface to be printed so that contact with the moving surface is maintained for a longer time. The apparatus for removing containers includes a suction cup moveable through an orbital path and operating on the end of the container to transfer successive containers to gripping belts which feed it rapidly onto a conveyor substantially free from any bouncing action or other motion disturbance. The container drying apparatus includes guides to cause containers to follow a skewed path along and across a conveyor in a manner which rotates the container about its axis and substantially uniformly exposes its sidewall, and a number of radiant heaters and coolers arranged to circulate air over the exterior sidewall of the container as it rotates and moves axially in a skewed path along and across the conveyor.

7 Claims, 44 Drawing Figures

INVENTORS.
ERIC S. BUHAYAR
ROBERT C. CROWE
JAMES E. HAZARD
JOHN J. JAAGUS
FRED W. WERNER
ROBERT W. WHEELER
BY
ATTORNEY.

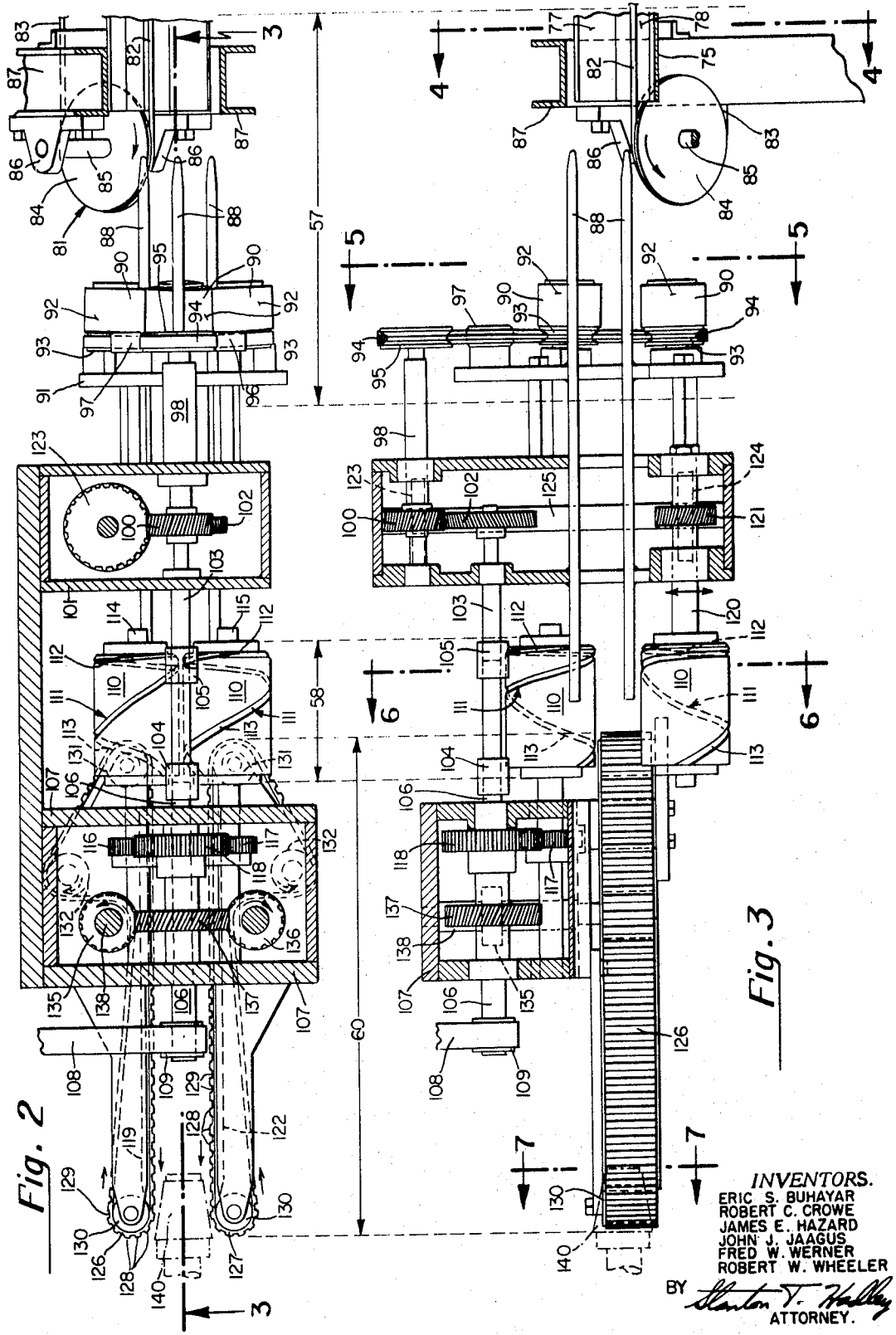

INVENTORS.
ERIC S. BUHAYAR
ROBERT C. CROWE
JAMES E. HAZARD
JOHN J. JAAGUS
FRED W. WERNER
ROBERT W. WHEELER
BY Stanton T. Hadley
ATTORNEY

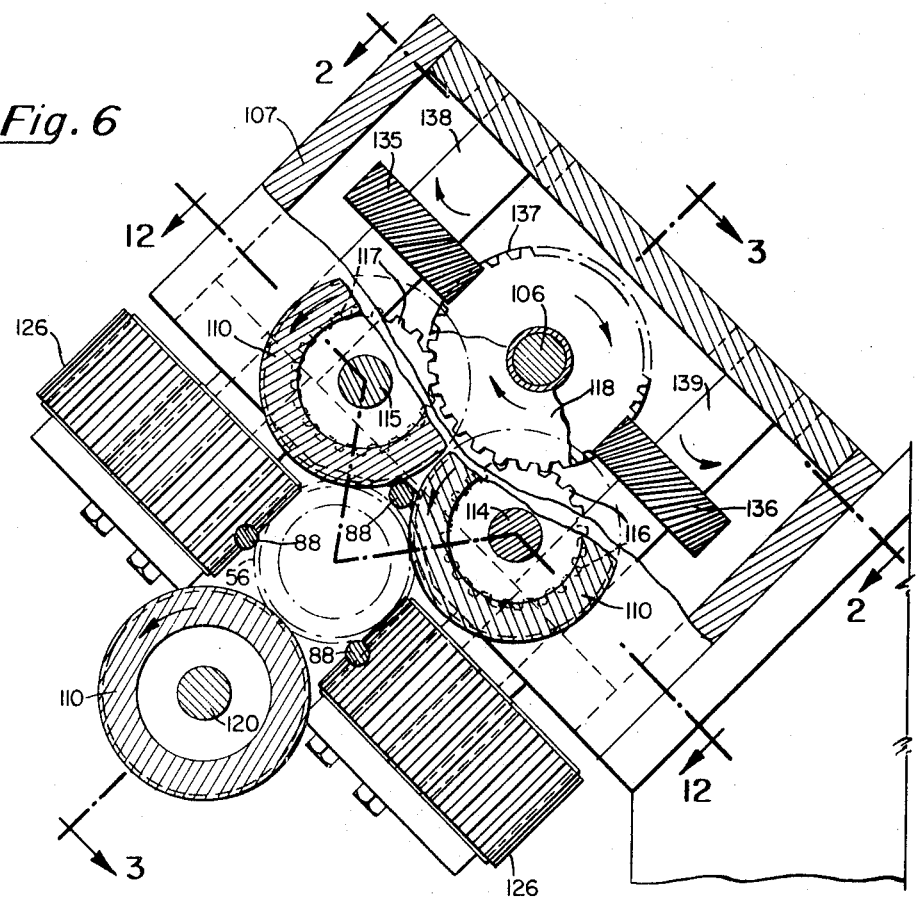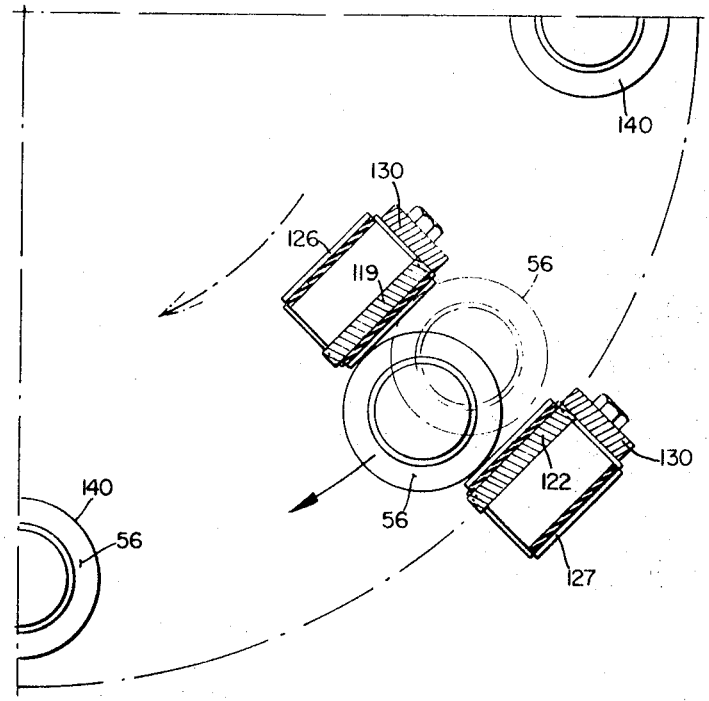

INVENTORS.
ERIC S. BUHAYAR
ROBERT C. CROWE
JAMES E. HAZARD
JOHN J. JAAGUS
FRED W. WERNER
ROBERT W. WHEELER

BY
ATTORNEY.

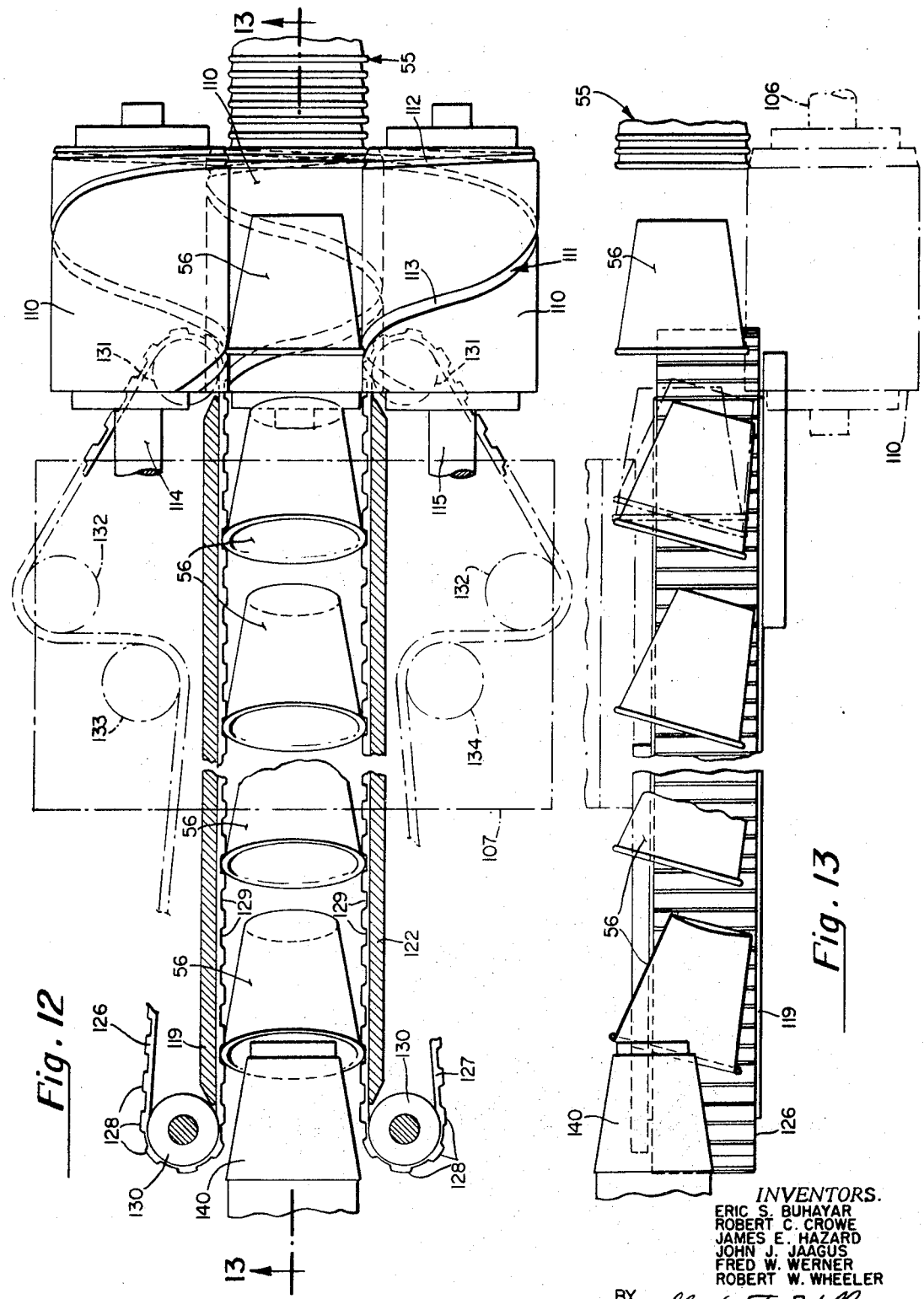

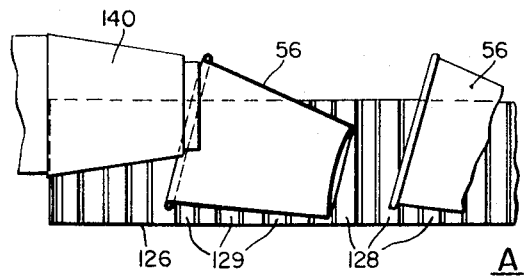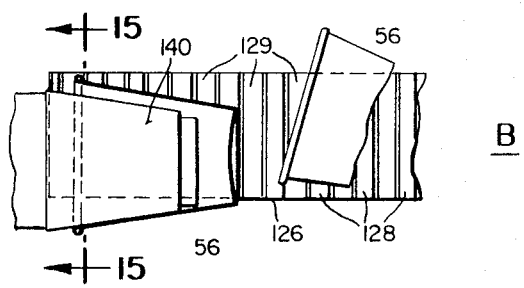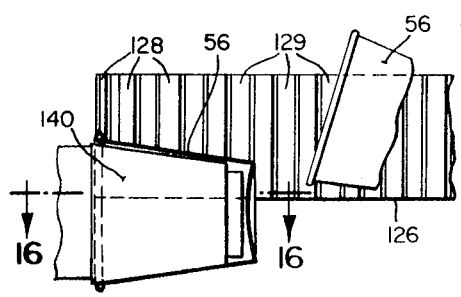
Fig. 14
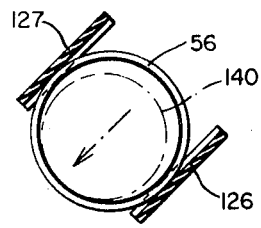
Fig. 15
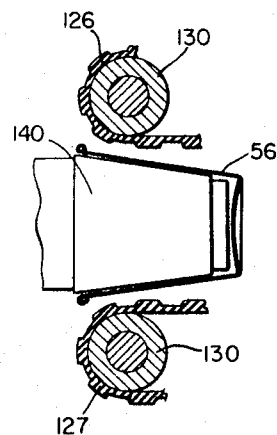
Fig. 16

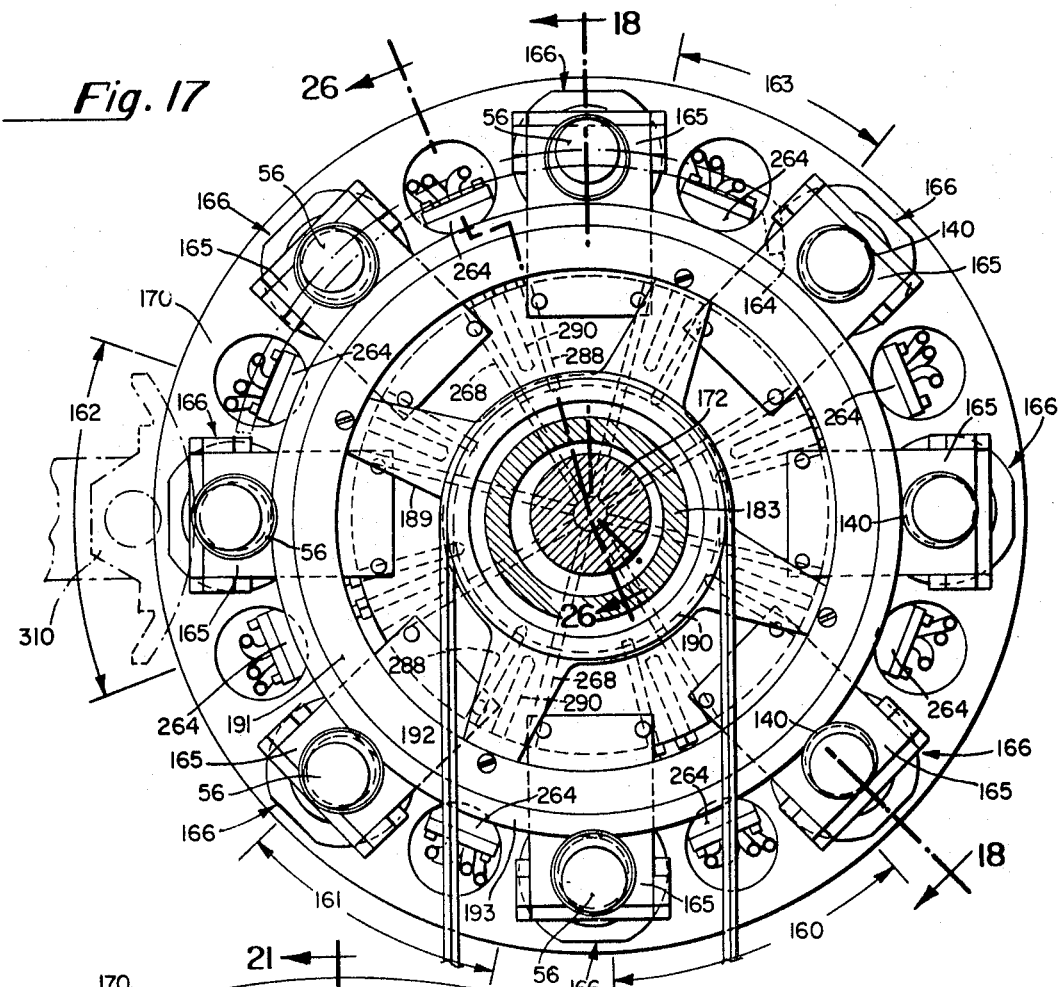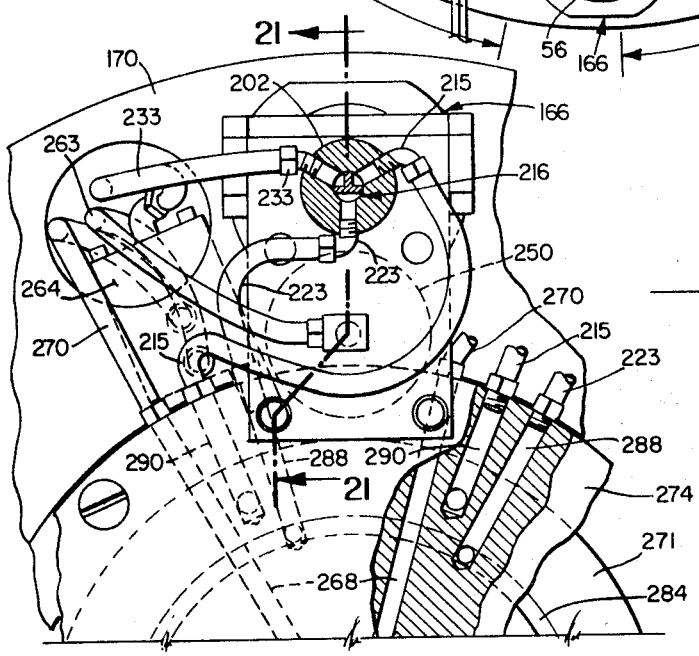

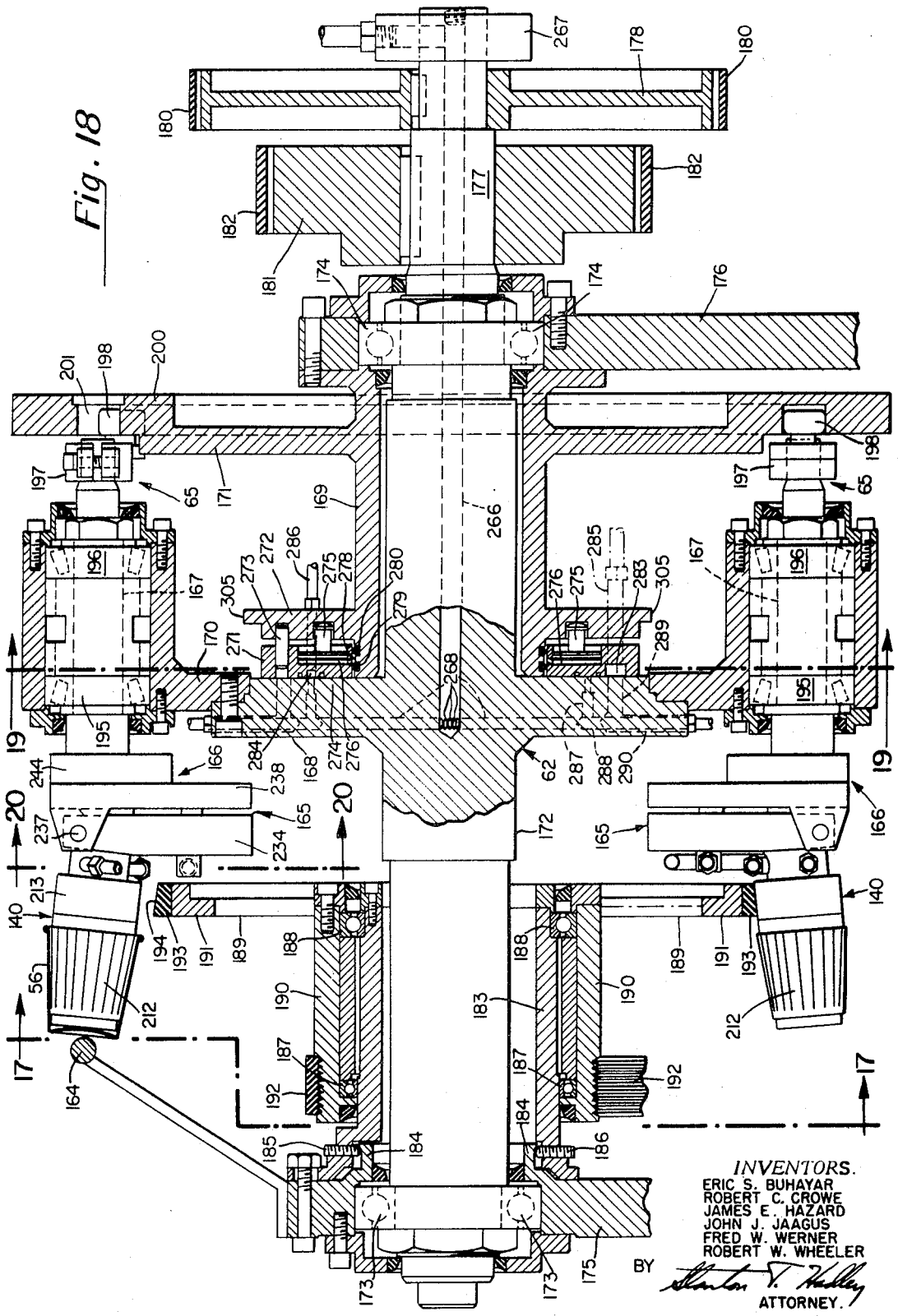

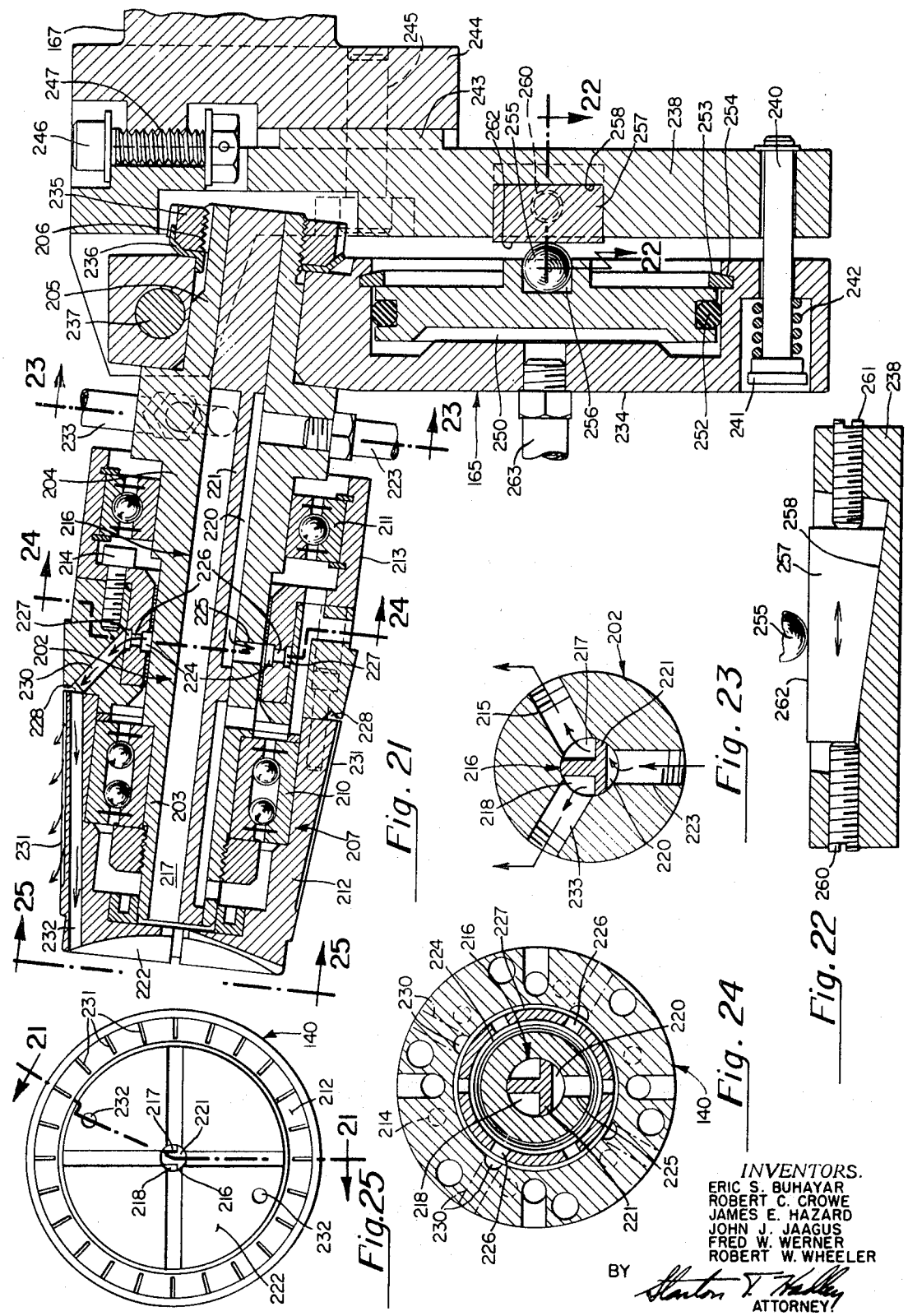

INVENTORS.
ERIC S. BUHAYAR
ROBERT C. CROWE
JAMES E. HAZARD
JOHN J. JAAGUS
FRED W. WERNER
ROBERT W. WHEELER
BY
ATTORNEY.

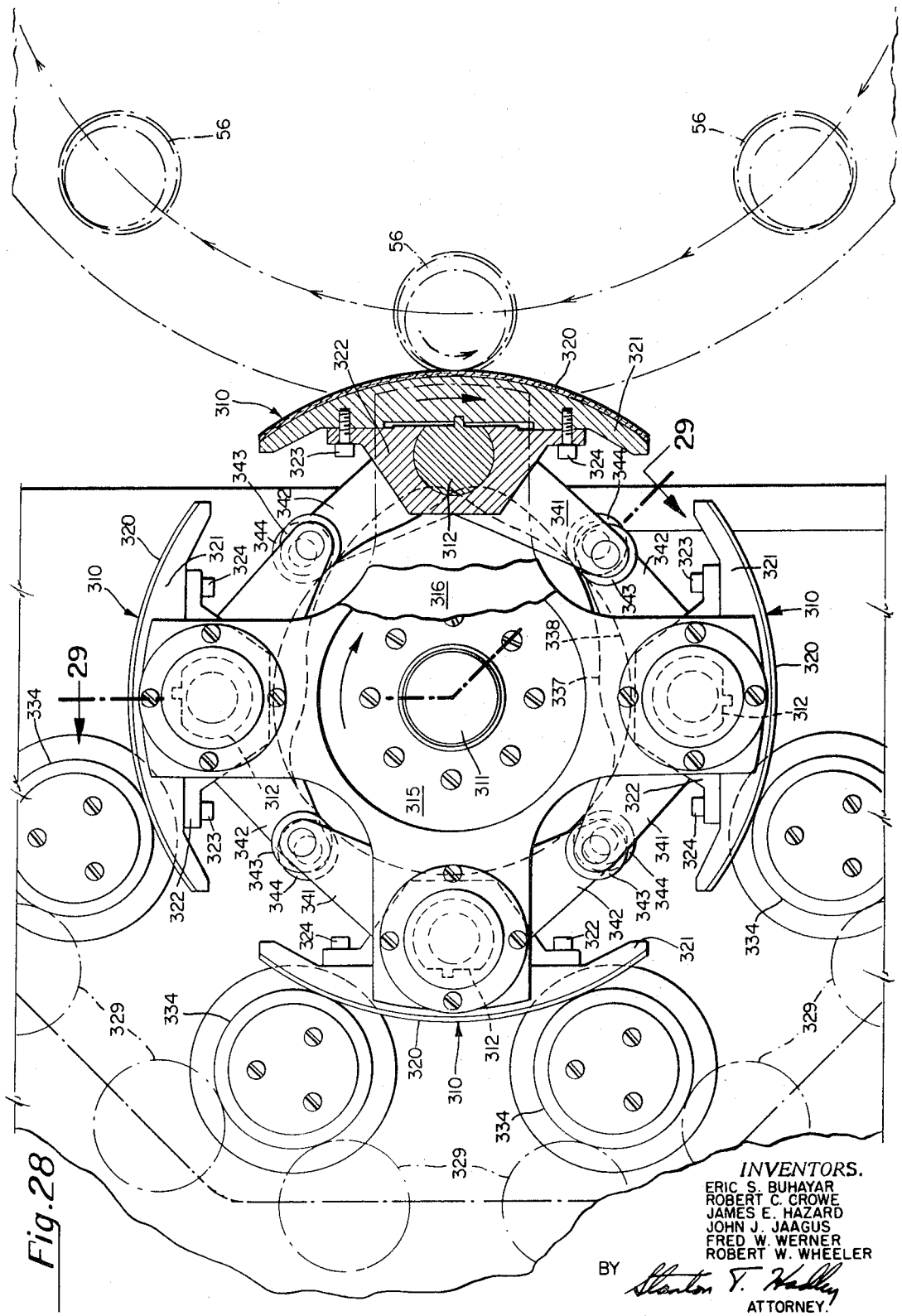

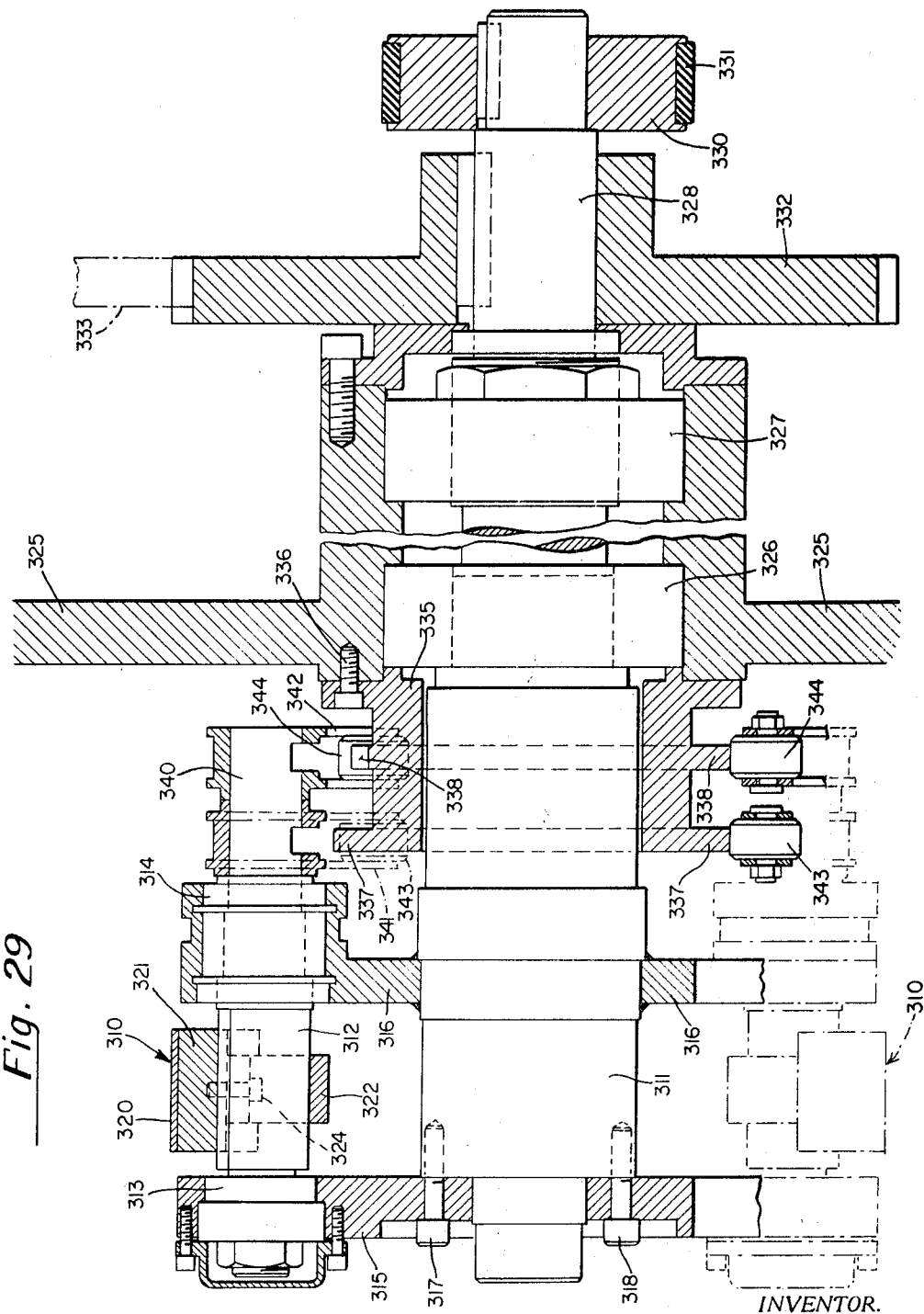

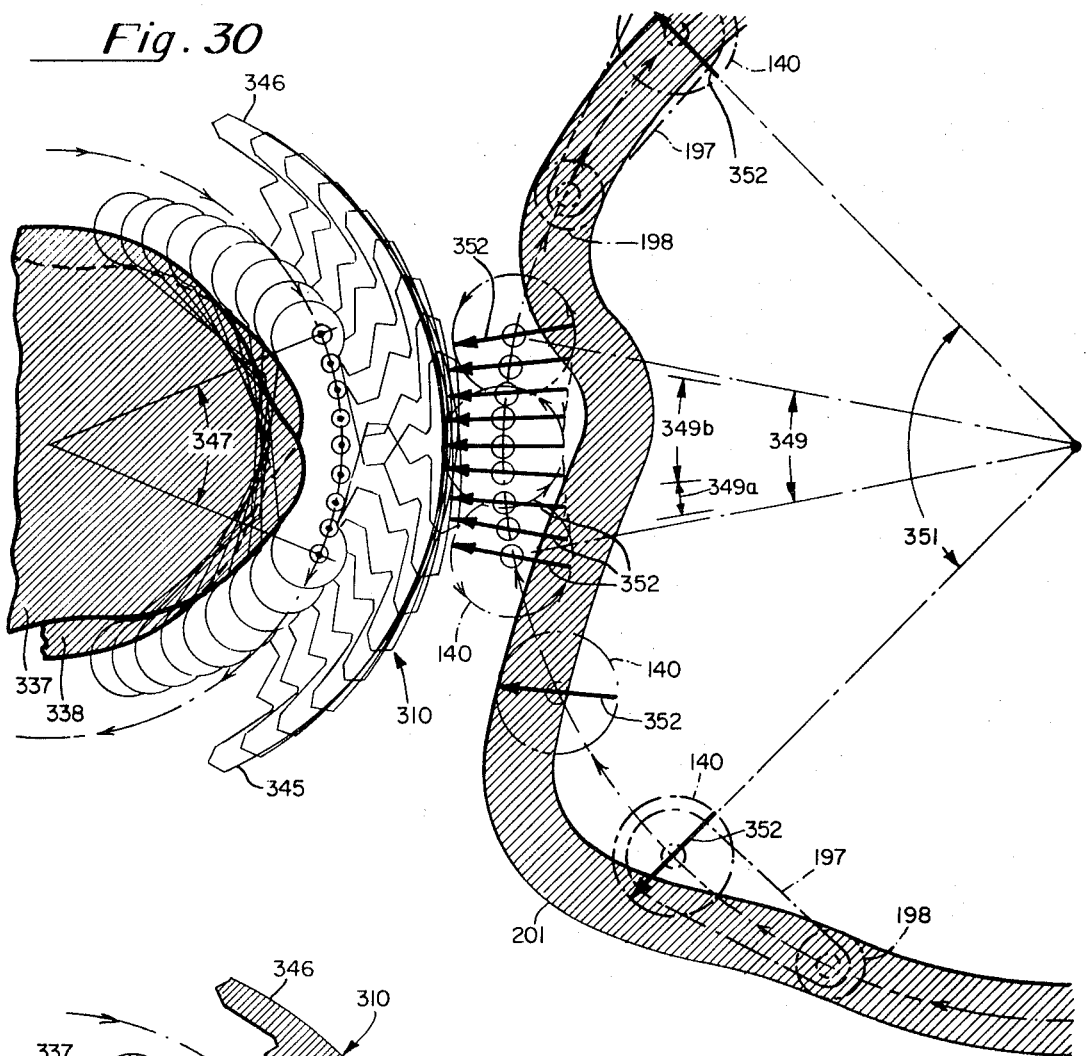
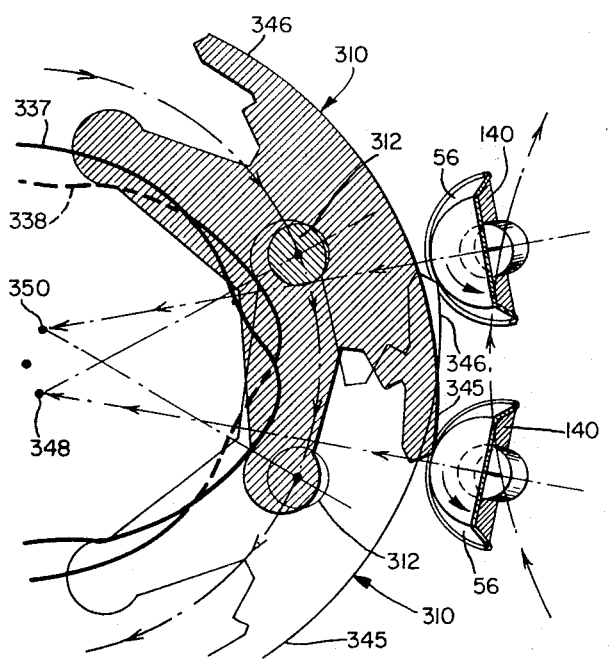

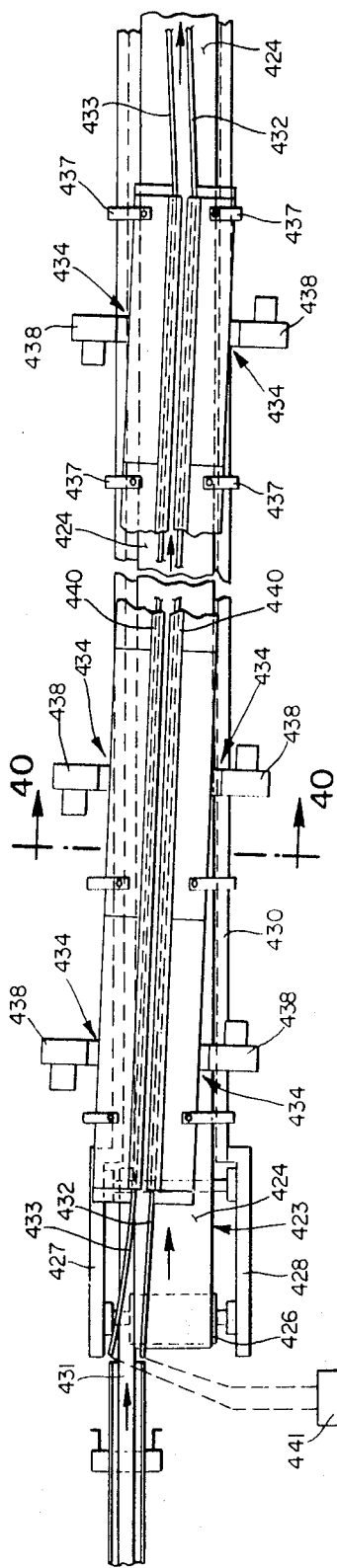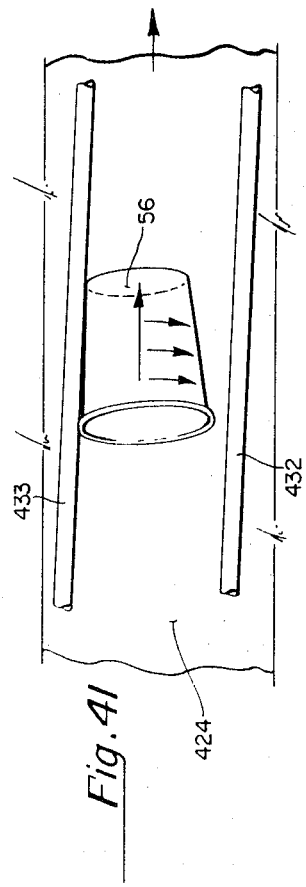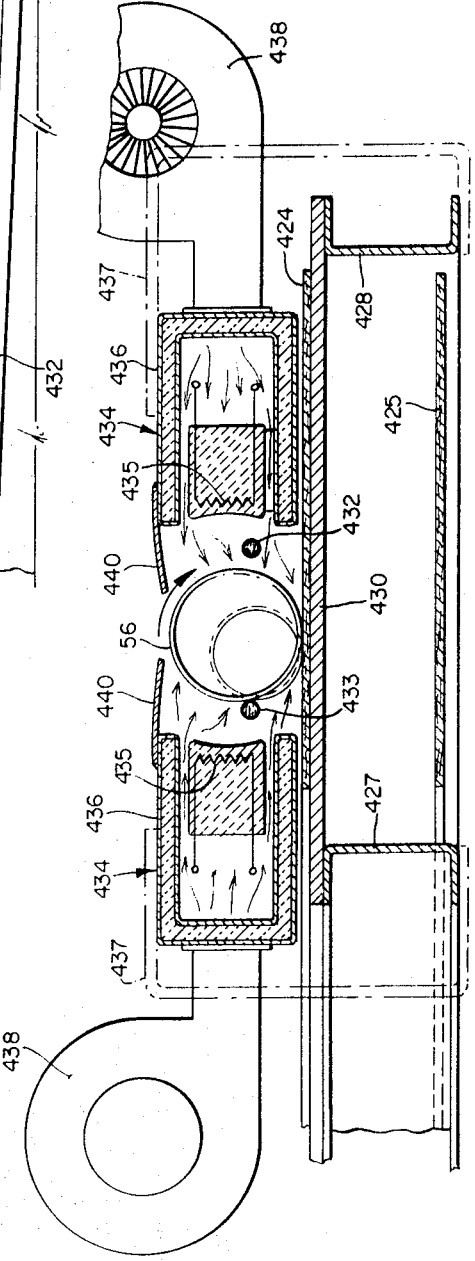

METHOD OF CONTINOUSLY MOVING CONTAINERS THROUGH A TREATMENT PROCESS

This application is a Division of U.S. Pat. application, Ser. No. 644,955 filed Jan. 9, 1967 entitled "Method and Apparatus for Printing Container Side Wall" which is now abandoned.

BACKGROUND OF THE INVENTION

1. FIELD OF THE INVENTION

This invention relates in general to a method and apparatus for printing and, more particularly, to a method and apparatus for printing container sidewalls.

In the broader aspects of the invention, the surface to be printed may be any printable exterior surface of revolution of an article, of which a container such as a cup or a can is one example, which surface appears either in a transitory or final stage of article formation. The articles to be printed or decorated preferably have a generally circular cross-section. Certain forms of the invention are particularly advantageous for decorating and printing hollow containers having either a cylindrical or a frusto-conical shape.

The term "cylindrical object" as used throughout the specification and claims is intended to include right cylindrical objects such as cans as well as other hollow objects whose outer surface is substantially a surface of revolution generated by the rotation of a line about an axis, including objects, such as cups and the like, which may have one or more frusto-conical surfaces. When the term "frusto-conical object" is used in the specification and claims, a cylindrical object as defined above which has at least one frusto-conical surface, such as a cup, is intended. It will be apparent and should clearly be understood that the invention relates to the treatment of these and other articles of a nature similar to that described above where this extension is warranted and practicable.

In some specific embodiments of the invention, the cylindrical or frusto-conical objects have an outwardly depending flange or lip which is contacted during treatment and handling of the object. Generally, containers such as cans have an outwardly depending raised strip or bead about the peripheral junction between one or both closed ends of the container and the adjoining sidewall. Similarly, containers such as cups generally have an outwardly depending bead or rolled lip disposed about the periphery of the open end.

This invention relates, in a more specific aspect, to a method and apparatus for separating or denesting and feeding cylindrical objects from a line or a stack onto a mandrel moving through an orbital path generally perpendicular to, and intersecting at a remote point, the path of the objects being fed thereto. One particular application of this method and apparatus is the feeding of cylindrical objects into a printer of the continuous type as described in this application. However, this aspect of the invention broadly relates to object separating and feeding apparatus which, in general, is also useful in a wide variety of container handling applications.

Another aspect of the invention relates generally to a turret assembly and, more particularly, to a turret assembly adapted for moving cylindrical objects through a treatment stage where a treatment such as printing is performed on their sidewalls. One particular embodiment of this aspect of the invention is especially designed to handle frusto-conical objects. This embodiment of the apparatus is utilized in a specific embodiment of the over-all printing apparatus of the invention to receive frusto-conical objects from an object feeding unit and to move them in an oriented disposition through a treatment station, after which it feeds them to an object removal or take-off station, all of the above being done in continuous motion as distinguished from intermittent or indexed motion.

Another aspect of the invention is a print-blanket assembly and a method for controllably pivoting print blankets carried through an orbital path in which they engage the sidewalls of cylindrical objects carried in rotation through their separate orbital path. The mechanism and method employed for actuating the print blankets has broader utility in a number of applications for printing moving surfaces other than the sidewalls of cylindrical objects.

A still further aspect of the invention relates generally to object handling equipment and more specifically to apparatus for handling cylindrical objects only by their ends so that the treated sidewalls of the objects remain free from contact. It has specific utility in the over-all printing apparatus of the invention in which it is used to remove cylindrical objects from the mandrels moving through an orbital path and to deposit them in a predetermined attitude on a transfer belt unit for conveyance to a remote point.

A still further aspect of the invention relates to a method and apparatus for drying decorating material on the sidewalls of printed objects. This method and apparatus are used to prepare cylindrical objects printed in accordance with the method and apparatus of the over-all printing system of the invention so that the objects may be freely handled, stacked, counted and packaged without marring the printed surface thereof.

2. DESCRIPTION OF THE PRIOR ART

In the past, the printing of the sidewalls of cylindrical objects such as containers has been extremely difficult and laborious. This is especially true of frusto-conical objects having tapered sides and arises largely from the difficulty of moving the surface of the tapered sidewall relative to a printing blanket in a uniform manner to accomplish printing without smearing the image. The high volume use and concomitant low cost of such objects dictate that any treatment process must be performed at a very high speed in order to be economical. The printing of paper cups is often done on the paper material in the flat sheet condition prior to its formation into the frusto-conical or cylindrical shape. However, such treatment is not possible or practical in the printing of plastic cups where the material undergoes considerable deformation during the formation of a cup. It is clearly impossible to do on glass containers. Thus, to perform the printing step prior to formation in either of the above types of objects would result in the complete or substantial destruction of the image detail during formation.

The need for printing the sidewalls of containers has increased with the advent of thin walled plastic containers of solid sheet, foam, or laminates since these articles are generally formed at extremely high production rates by processes such as differential pressure forming, blowmolding, injection molding and the like. In addition to drinking cups, such articles are widely used in a large number of packaging and storage applications. In addition to decoration, it is desirable that the sidewalls of such containers and cups be printed to identify either the contents of the package, the manufacturer, or both.

Several economic aspects have a bearing on the printing problem. Such articles generally sell for a very low price which represents a nearly negligible fraction of the value of the package contents. Therefore, any printing process must be of sufficient low cost and high rapidity such that it adds very little to the cost of the article. In addition, any articles printed incorrectly must be discarded or, in some instances, ground to scrap and remolded. To achieve the above-mentioned low cost, manufacturers have to maintain a very low percentage of error and resulting scrap loss throughout the process of manufacture, including the printing stage. Thus, any printing process must be highly accurate and devoid of any treatment or handling which will damage the articles. This has been found difficult in the past at the high speeds required and with these types of articles.

In the past, printing systems have operated intermittently for separately positioning, stabilizing, and printing articles such as cups. Those familiar with mechanical devices can readily appreciate the speed limitations of intermittently operating apparatus. The inertia of the elements involved as well as the fragile nature of the article being treated makes it impracticable to consider treating more than about 150 to about 200 articles per minute. On the other hand, it generally has been thought to be too difficult to perform such an operation on articles of this nature in a continuous operation. Typical printing apparatus of the intermittently operating type is disclosed in U.S. Pat. No. 3,195,451 issued July 20, 1965 to J. C. Hovekamp et al.

Such printing apparatus as has been designed for continuous operation has been solely for the printing of the sidewalls of cylindrical cans, as distinguished from tapered sidewalls of frusto-conical objects such as cups. In this regard, see U. S. Pat. No. 3,261,281 issued July 19, 1966 to R. J. Hartmeister. In many respects, the complexity of this apparatus makes the problem of high speed printing of container sidewalls more foreboding. The rotating push rod assembly and dual can holding system of mandrels and retractable pockets dictate that the apparatus be made quite accurately and be adjusted carefully to insure reliability. While such apparatus might be used for printing metal cans, it is very doubtful that such apparatus could be used for printing more fragile objects such as containers or cups of paper, plastic, or glass.

In view of the above-mentioned difficulties and other deficiencies and shortcomings of the prior art, it was surprising to discover that reliable apparatus can be constructed which is capable of printing container sidewalls in a continuous manner, as distinguished from an intermittent manner, in an economical operation at much higher speed, on the order of 500 articles per minute and higher, with extremely low scrap losses due to article damage or printing inaccuracies in the high speed operation.

It is a principle object and advantage of the present invention to provide a method and apparatus for printing the sidewalls of cylindrical objects including frusto-conical cups or containers in a manner which not only overcomes many of the difficulties of the prior art, but which results in a number of significant advantages and improvements. In accordance with the invention, clear and accurate printing may be done on the sidewall of a cylindrical object by a continuous process which is extremely rapid and is quite economical. The printed image may consist of up to three or even more separate colors without encountering problems. The apparatus of the invention may be utilized to print in continuous operation the sidewalls of frusto-conical objects such as cups having tapered sides.

In order to successfully overcome the above-mentioned problems and to develope the printing apparatus and to carry out the printing method of the invention, it was found necessary to develop a number of ancillary methods and apparatus which form a part of the over-all printing method and apparatus but which are believed to have considerable application and utility separate and apart from the over-all printing method and apparatus. These developments arose from one or more of a variety of requirements such as the high speed continuous operation, the fragile nature of the article to be printed, and the shape of the surface to be printed.

In the manufacture of hollow cylindrical objects and especially frusto-conical objects such as cups and the like, such objects are generally transported between manufacturing stages in a stacked or nested condition so that they can be conveniently moved about in a minimum amount of space. These objects, especially when they are made of plastic or other materials are often quite brittle even though they possess some flexibility.

The rapid handling of these objects has presented numerous problems, one of which is the ability to rapidly separate successive objects from a stack or line of objects and to convey them into position at a treatment stage or on a treatment apparatus.

In the past, different types of cup feeders have been employed for denesting and feeding cups in intermittent operations. Many of these involved gravity or air pressure actuation of cups, the release and separation of cups from the stack being controlled by some gating device. While such feeding mechanisms are sometimes satisfactory for dispensers and intermittently operating equipment, they are completely unsuitable for a high speed continuous process. None of the known systems suggest any means for positively feeding denested cups onto mandrels moving though an orbital path perpendicular to the path of the cups.

Unexpectedly, it was discovered that cylindrical objects such as cups can be separated or denested and fed onto mandrels moving through such an orbital path relative to the path of the objects. It was even more surprising to find that such a feeder can be used to separate or denest and feed in a positive manner even relatively fragile objects at extremely high speed to treatment apparatus such as the printing apparatus of the invention. One aspect of the present invention is the ability to separate individual hollow cylindrical objects successively from one end of a stack of objects and to feed them onto a mandrel moving across the path of the objects at a remote point. This permits the mandrel to then convey the objects through a treatment stage in a supported condition.

The apparatus of the invention includes stack advancing means for advancing at least a portion of a stack of nested or aligned objects by engaging the periphery of at least one of the objects. Denesting means are arranged in the apparatus of the invention to engage the forwardmost object in the stack and to advance it more rapidly than the rate of advance of the stack. The apparatus also incorporates feeding means which are arranged to receive successive separated objects from the denesting means and to convey them toward a remote point. In a specific embodiment of the invention, the feeding means are arranged to convey successive separated objects in a predetermined orientation, and to feed the objects onto successive mandrels as they cross the path of successive objects.

It is an object of the present invention to provide a method and apparatus for individually separating or denesting and feeding hollow cylindrical objects, such as containers or cups, from nested or aligned relationship in a stack.

It is an additional object of the invention to provide such a method and apparatus arranged for placing hollow cylindrical objects onto a mandrel moving through an orbital path generally perpendicular to the path of the objects.

It is a further object and advantage of the invention to provide such a method and apparatus for handling such objects on a continuous basis rather than an intermittent basis.

One of the most difficult problems to be overcome in printing or treating cylindrical objects is to provide some means of firmly supporting the objects and moving them past the printing or treatment station. This problem is especially acute where the objects are containers made of relatively fragile materials such as paper or plastic. The supporting means must be designed to facilitate the engagement and removal of given cylindrical objects. All of the foregoing requirements are even more difficult to achieve when the printing or treatment operation is continuous rather than intermittent.

The intermittent systems of the prior art utilize turrets mounted for indexed operation and carrying mandrels for supporting containers. No means is provided for allowing emplacement, treatment or removal of containers while the turret is moving. The only known continuously operable equipment of the prior art employs a series of loose-fitting mandrels and retractable pockets for supporting containers. These were quite complex mechanisms and relied heavily on the strength of the container for their success. None of the equipment of the prior art provided any means for continuously printing tapered sidewalls of frusto-conical containers, and especially those made of relatively fragile materials.

The turret assembly of the present invention overcomes many of the difficulties of the prior art and has a number of new advantages. The turret assembly includes a number of rotatably mounted mandrels carried through a fixed orbital path about the turret axis. Means are also provided to spin successive mandrels as they pass through a portion of the orbital path to cause their surface to move at the speed required in the printing or treating operation. Where cylindrical objects or containers having tapered sidewalls are to be printed, the apparatus includes means to controllably alter the direction in which the tilted mandrel axis points as the mandrels are carried through the treatment section of the orbital path. In addition, the turret assembly of the invention includes a pneumatic system adapted to apply vacuum through the mandrel to grip or hold a container to the surface of the mandrel during certain portions of the orbital path and to apply pressure to loosen or release containers from the mandrels in other portions of the orbital path.

Accordingly, it is an object and advantage of the present invention to provide a method and apparatus for supporting a hollow cylindrical object and for moving it past a treating or printing station.

It is an additional object and advantage of the present invention to provide a method and apparatus for properly orienting a hollow cylindrical object having a frusto-conical configuration and tapered sidewalls as it is carried in supported condition through a treatment station.

It is a further object of the present invention to provide a mandrel carrying turret assembly including means for facilitating emplacement of containers upon and removal of containers from said mandrels while the turret assembly is continuously moving.

Printing of container sidewalls in an intermittent operation is normally accomplished by one or more print blankets arranged about the periphery of a cylinder. In some instances the surface of the container is contacted by the print cylinder and the container is rotated in a fixed position. In the case of hollow cylindrical objects having large inertia, the objects may be separately rotated at a speed equal to the speed of the print blanket to avoid smearing of the printed image caused by slippage due to inertia.

The above method is generally unacceptable where a hollow cylindrical object is to be printed in a continuous operation while moving through an orbital path. The arcuate print blanket would have, in theory, only a momentary single line of contact with the surface of the object as it momentarily moved through a position of incidence or engagement with its surface. Therefore, some means was required of maintaining surface contact between the hollow cylindrical object and the print blanket during movement of the rotational axis of the cylindrical object relative to that of the print blanket.

Surprisingly, two ways of achieving this objective were discovered. One method is to move the mandrel, carrying the object, out of its circular orbital path and into a revised path during the printing stage in which it generally follows the periphery of the print blanket cylinder. Another more preferred method is to actuate the print blankets in a rocking motion to cause the object-contacting line on the print blanket to move through an arc path corresponding to a portion of the orbital path of the object carried on the mandrel.

Accordingly, it is an object of the present invention to provide a method and apparatus for enabling longer surface contact between a moving pring blanket and a surface carried through an orbiting path.

It is a further object of this invention to provide such a method and apparatus by which a mandrel carrying a cylindrical object through an orbital path is moved out of its circular orbital path into a revised path following the periphery of the print blanket cylinder.

It is a still further object of this invention to provide a method and apparatus for controllable rocking the arcuate print blankets on the periphery of a print cylinder to cause the object-contacting line on the print blanket to move through an arc path corresponding to a portion of the orbital path of the cylindrical object carried on the mandrel.

The removal of cylindrical objects or containers from mandrels carried on an intermittently operating or indexed turret generally presents no difficult problems. However, the removal of such objects from mandrels mounted on a continuously moving turret has not been known in the prior art. The problem is made more severe when the containers have been printed on their sidewalls necessitating engagement of the container only by the exposed end which has not been printed. In a high speed operation any device which would accomplish this must engage and withdraw the cylindrical object from the mandrel for a distance equal at least to the length of the object while the moving mandrel has advanced only a very short relative distance. Conventional container handling equipment would be impractical for this purpose especially where the speed required was quite high and the objects were made of fragile material such as paper or plastic.

It has now been found possible to remove cylindrical objects or containers from a rapidly moving mandrel carried on a rotating turret assembly by reliable mechanical means which accomplish removal during a short distance of mandrel travel. The removal apparatus of the invention utilizes a suction cup moveable through an orbital path and adapted to engage the closed end of the container and to move it rapidly to a conveyor means for transfer to a remote position. Important to the success of this device was the development of a cam control system for causing the suction cup to move through an accurately controlled motion path in which the suction cup has a continuously changing velocity enabling it to swiftly remove a cylindrical object from a position of interference with the path of its carrying mandrel and to smoothly deposit it on to a conveyor in a condition where smearing of the image on its sidewall is prevented.

Accordingly it is an object and advantage of the present invention to provide a method and apparatus for removing cylindrical objects or containers from mandrels carried by a turret assembly through an orbital path in continuous motion.

It is a further object to provide such a method and apparatus in which the cylindrical object is gripped only by contact with its closed bottom.

The curing or drying of decorating material on the sidewalls of cylindrical objects has not presented problems in the past since very few objects were printed and the output of present intermittently operating container printing apparatus is relatively low. With the advent of the widespread use of container printing equipment, it has become necessary to provide a drying means capable of handling large numbers of cylindrical objects or containers having wet ink or decorating material on their sidewalls. Such a system preferably should accomplish drying uniformly over the surface of the containers in the shortest possible time so that the drying operation can be performed in a reasonably small space and with a minimum of apparatus.

Surprisingly, a simple but reliable method and apparatus for drying or curing ink or other decorating material on container sidewalls has been discovered. The method and apparatus of the invention accomplish uniform curing of the ink as the cylindrical objects are moved rapidly through a curing region. The apparatus involves means for transporting containers oriented in a predetermined direction past heating means located in the curing region. Means are also provided to rotate the containers about their axes as they pass through the curing regions.

It is an object of the invention to provide a method and apparatus for curing ink on the sidewalls of cylindrical objects or containers.

It is a further object of the invention to provide a method and apparatus for performing such curing at very high speeds and in a uniform manner.

These and other objects and advantages of the invention, both of the over-all printing system and of the numerous subassemblies forming a part thereof, will become apparent from the detailed description of specific embodiments thereof which follow.

BRIEF SUMMARY OF THE INVENTION

The high speed continuous printing, treating, and handling apparatus of the invention includes a turret assembly which has a rotatably mounted frame, a plurality of support mandrels mounted for rotation and carried by the frame through an orbital path. Successive mandrels are substantially equidistantly spaced from one another. The orbital path has a plurality of functional sections including an object pickup section, an object rotate section, an object print section, and an object removal section. Feeding means are included for serially advancing cylindrical objects in a line and include object separating means for increasing the relative distance between the leading object and successive objects in the line. The feeding means are adapted to advance successive cylindrical objects toward the turret assembly and to place them onto successive support mandrels carried by the rotatably mounted frame through the object pickup section of the orbital path. Rotating means are included for imparting axial spin to successive support mandrels carried by the rotatably mounted frame through the object rotate section of the orbital path. Printing means are included for applying decorative indicia to the exterior cylindrical surface or sidewall of successive cylindrical objects carried by support mandrels through the object printing section of the orbital path. The printing means include at least one arcuate print blanket, a source of decorating material to be applied to the surface of the object to be decorated, at least one transfer means disposed between the source of decorating material and a position of interference with the rotating print blanket and adapted to transfer decorating material to the print blanket for application to the surface to be decorated. The print blanket is mounted for rotation about a first axis and intermittent rocking movement about a second axis parallel with the surface of the print blanket and perpendicular with the direction of movement of the print blanket, the rocking movement occuring at least during the period of time when the print blanket contacts the surface of the cylindrical object to be decorated. Handling means are included for removing decorated objects from successive mandrels as they are carried through the object removal section of the orbital path. The handling means include conveying means spaced from the mandrels carried by the rotatably mounted frame through the object removal section of the orbital path and pickoff means for gripping the cylindrical objects and for transferring them to the conveying means. Drying means are included for drying the decorating material on the surface of the cylindrical objects and include means to rotate the object while applying heat to the surface thereof. Drive means are included to drive the rotatably mounted frame, the rotatably mounted print blanket, the rotating means, the feeding means, and the object removal means, in a substantially constant speed relationship to one another.

A more specific embodiment of the invention which is adapted to treat hollow objects having a frusto-conical configuration, includes mandrels having tapered sides and a frusto-conical shape. The mandrels have their rotational axes inclined relative to the rotational axis of the turret assembly so that the line of contact of the tapered side of the mandrel with the arcuate print blanket is substantially parallel to the axis of rotation of the print blanket.

The invention also includes a method for decorating the exterior cylindrical surface or sidewall of cylindrical objects having one open end, one closed end, and upstanding sidewall, and a peripheral flange extending outwardly therefrom. This method is applicable to cylindrical objects including those having either a right cylindrical or a frusto-conical configuration. In the method, cylindrical objects are individually separated and fed from a source. The objects are successively placed onto moving mandrels which cross their path at a remote point. The objects are continuously moved in supported condition upon the mandrels through an orbital path including an object rotate section, an object treatment section and an object removal section. As the cylindrical objects pass through the object rotate section and before they move through the object treatment section, a rotational moment is applied to cause them to rotate about their axes. The exterior surface of successive objects is treated as each object moves in continuous motion through the object treatment section of the orbital path after which the objects are removed from the continuously moving mandrels as they pass through the object removal section.

The invention includes apparatus for individually separating and feeding hollow cylindrical objects having an upstanding sidewall and a peripheral flange extending outwardly therefrom from aligned or nested relationship in a stack. The separating and feeding apparatus includes stack advancing means adapted to engage the flange of at least one of a plurality of objects forming the stack to advance at least a portion of the stack in a direction substantially parallel with the axis of the object. Denesting means are provided to engage the flange of the forwardmost object in the stack and to advance the object axially at a rate greater than the rate of advance of the stack. Feeding means are provided to receive successive objects from the denesting means and to convey them toward a remote position in a predetermined orientation.

The invention also includes a method of individually separating and feeding hollow cylindrical objects having upstanding sidewalls and a peripheral flange extending outwardly therefrom from aligned or nested relationship in a stack. The method includes the step of engaging at least one of a plurality of cylindrical objects forming a stack and advancing the preceding portion of the stack in a direction parallel with the axis of the object. The forwardmost object in the stack is gripped by engaging spaced portions of its peripheral flange. It is then advanced at a rate greater than the rate of advance of the remainder of the stack. The object is again gripped by engaging spaced portions of the peripheral flange and advanced toward a remote position. In some embodiments of the method of the invention, the angular orientation of the axis of the object is controlled as the object is advanced toward the remote position. In some embodiments of the invention, the objects within the preceding portion of the stack are rotated about their axes prior to gripping of the forwardmost object in the stack. Also, some embodiments of the method include placing the cylindrical object onto a moving mandrel as it crosses the path of the object.

The invention also includes a turret assembly for supporting hollow cylindrical objects for treatment of the outside surface thereof by a continuous object treatment process. The turret assembly has a frame mounted for rotation in a plane about a rotational axis. A plurality of object support mandrels are carried by the frame through an orbital path which has an object pickup section, an object rotate section, an object treatment section and an object removal section. The mandrels have an outside surface configuration conforming substantially to the inside surface configuration of the cylindrical objects. Driving means are provided for rotating the frame. Object rotate means are provided for applying a rotational moment to mandrels carried through the object rotate section of the orbital path to cause the outside surface of the objects carried thereon to attain a predetermined rotational speed. Some embodiments of the turret assembly have mandrels mounted for radial movement relative to the rotational axis of the frame and include mandrel actuation means adapted to change the distance between the mandrels and the rotational axis of the frame during rotation of the frame and a pneumatic system for detecting the presence and absence of a cylindrical object on successive mandrels. The pneumatic system is operably connected to the mandrel actuation means so that the distance between successive mandrels and the rotational axis of the frame is controlled in response to the presence or absence of an object upon the respective mandrels.

The invention also includes a method for continuously moving hollow cylindrical objects in supported condition through an object treatment process. The method includes moving the objects along a path through a treatment station, and applying a rotational moment to the objects to cause them to rotate about their axes prior to movement through the treatment station. The angular orientation of the rotational axis of each of the cylindrical objects relative to the path is controllably varied as the objects are carried through the treatment station so that the portion of the exterior surface of the rotating object being treated which momentarily is nearest the treatment station is uniformly spaced therefrom along the length of the cylindrical object as it moves in rotation along the path.

The invention also includes apparatus for printing indicia on the exterior surface of hollow cylindrical objects. The apparatus includes support means for carrying an object through a curvilinear orbital path about a fixed axis and rotating means for rotating the cylindrical object about its axis in a direction counterrevolutionary to the curvilinear direction of the orbital path. At least one pivotably mounted arcuate print blanket having a printing surface containing an image is provided which is adapted for pivotal movement about a pivot axis parallel with its axis of curvature. The print blanket has a leading end and a trailing end and is mounted for rotation through an orbital path about a rotational axis more remotely spaced from the print blanket than is the pivot axis. Drive means are provided for rotating the print blanket about its rotational axis in a direction counterrevolutionary to the direction of rotation of the object. Actuating means are operably connected to the print blanket to effect controlled pivotal movement of the print blanket about the pivot axis so that contact of the exterior surface of the cylindrical object is maintained along a line with a continuous changing portion of the printing surface of the arcuate print blanket while the rotating object is carried in continuous motion through a printing section of the orbital path. Generally, the leading end of the print blanket is initially advanced radially outwardly from the rotational axis as it approaches the oncoming surface of an object to be printed and is gradually withdrawn radially inwardly toward the rotational axis as the object is carried through the printing section of the orbital path while the trailing end of the print blanket is advanced radially outwardly.

The invention also includes a method for printing indicia on the exterior surface of hollow cylindrical objects. The method includes carrying the objects through a curvilinear orbital path about a fixed axis. The objects are rotated about their cylindrical axes in a direction counterrevolutionary to a curvilinear direction of the orbital path. The exterior sidewall surface of the cylindrical object is contacted along a line with a continuously changing portion of the printing surface of an arcuate print blanket containing an image thereon while the rotating object is carried in continuous motion through a printing section of the orbital path.

The invention also includes apparatus for removing hollow cylindrical objects from continuously moving mandrels passing through the object removal section of an orbital path, which objects have a closed end, upstanding sidewalls, a peripheral flange extending outwardly therefrom, and wet ink or other decorating material on the exterior surface of the sidewalls. The apparatus includes object engaging means adapted to grip the closed end of the object. Linkage means are operably connected to the object engaging means and actuating means are operably connected to the linkage means so as to cause them to move the object engaging means through a predetermined cyclical motion path in response to the actuating means. The motion path extends at least from the point where the object engaging means grip the closed end of a cylindrical object to a point where the open end of said object clears said mandrel. Conveying means are provided to receive a cylindrical object released by the object engaging means and to move it to a remote point.

The invention includes a method for removing hollow cylindrical objects from continuously moving mandrels passing through the object removal section of an orbital path, which objects have a closed end, upstanding sidewalls, a peripheral flange, and wet ink or other decorating material on the exterior surface of their sidewall. In the method, the closed end of the cylindrical object is engaged as it is carried through the object removal section of the orbital path. The cylindrical object is moved in a direction away from the mandrel while simultaneously being moved along the orbital path at substantially the same speed as that of the mandrel so that it is withdrawn from the mandrel. The cylindrical object is gripped by engaging the peripheral flange thereof at spaced points after which the closed end is released. The gripped object is advanced to a remote point.

The invention also includes apparatus for curing ink carried on the exterior surface of a cylindrical object having at least one peripheral flange extending radially outwardly from the exterior surface. In the apparatus, conveyor means are provided having a carrying surface with a fixed path of movement operable to convey a cylindrical object disposed thereon through an ink curing region. Feeding means are provided for introducing the cylindrical object onto the carrying surface with its cylindrical axis generally oriented in the same direction as the fixed path of movement of the carrying surface. Guide means are disposed above the carrying surface which are adapted to move a cylindrical object disposed upon the carrying surface transversely across at least a portion of the width of the carrying surface as it moves through the ink curing region. The transverse movement is accomplished in a manner whereby the cylindrical object is rotated about its axis. Heating means are disposed along at least a portion of the path of movement of the carrying surface in the ink curing region. The heating means are adapted to apply heat to the exterior surface of the cylindrical object. In some embodiments of the invention, cooling means are also disposed along a portion of the path of movement of the carrying surface following the heating means.

The invention also includes a method for curing ink or other decorating material carried on the exterior surface of a cylindrical object having at least one peripheral flange extending radially outwardly from the exterior surface. In the method, the object is supported on a support surface by contact with one point on its peripheral flange and one point on the exterior surface. The support surface and the object thereon are moved through a drying region in which the object is rotated about its cylindrical axis. Radiant heat is applied to the exterior surface of the object during rotation thereof.

The invention has been generally described and some of its features pointed out in the foregoing. Specific embodiments will now be described with reference to the accompanying drawings in which like reference characters have been used to refer to like parts wherever they may occur.

BRIEF DESCRIPTION OF THE DRAWINGS

FIG. 2 is an elevation view of object feeding apparatus of the invention, employed with the apparatus shown in FIG. 1, taken at an angle of 45° to the horizontal and showing part in section, FIG. 3 is a sectional elevation view of the object feeding apparatus taken along line 3—3 of FIG. 2, FIG. 6 is a sectional view through the denesting means of the object feeding apparatus taken along line 6—6 of FIG. 3, FIG. 7 is a sectional view through the object feeding means of the object feeding apparatus taken along line 7—7 of FIG. 3, FIG. 12 is a sectional view taken along line 12—12 of FIG. 6, illustrating the cooperative arrangement of denesting means and the feeding means relative to a moving mandrel upon which an object is to be inserted, FIG. 13 is a sectional view taken along line 13—13 of FIG. 12, illustrating the attitude in which an object is held by the feeding means, FIG. 14A through 14D are progressive views illustrating sequential stages of placement of an object onto a moving mandrel by the object feeding apparatus of the invention, FIG. 15 is a sectional view taken along line 15—15 of FIG. 14B, illustrating one position of an object held in the object feeding means, FIG. 16 is a sectional view taken along line 16—16 of FIG. 14C, illustrating the position of a moving mandrel relative to the object feeding means, FIG. 17 is a sectional end elevation view of a specific embodiment of a turret assembly of the invention, employed with the apparatus shown in FIG. 1, FIG. 18 is a sectional side elevation view taken along line 18—18 of FIG. 17, FIG. 20 is a sectional view taken along line 20—20 of FIG. 18, illustrating the manner in which the plate valve is connected to the control valves, the mandrels, and the mandrel tilting cylinder, FIG. 21 is a sectional elevation view showing the detailed construction of a mandrel and its supporting assembly, taken along line 21—21 of FIG. 20, FIG. 22 is a sectional view taken along line 22—22 of FIG. 21, illustrating the manner in which the mandrel tilt angle is adjusted, FIG. 23 is a sectional view through the central portion of a mandrel core taken along line 23—23 of FIG. 21, FIG. 24 is a sectional view through a mandrel taken along line 24—24 of FIG. 21, showing internal passages in the mandrel, FIG. 25 is an end view of a mandrel taken along line 25—25 of FIG. 21, FIG. 28 is a side elevation view of object printing apparatus of the invention, employed with the apparatus shown in FIG. 1, FIG. 29 is a sectional view of the object printing apparatus taken along line 29—29 of FIG. 28, FIG. 30 is a diagrammatic elevation view illustrating sequential stages of motion of the printing blanket and a moving object to be printed which occur upon operation of the object printing apparatus of the invention, FIG. 31 is a diagrammatic elevation view of a portion of the object printing apparatus of the invention showing two positions of the printing blanket relative to a moving object to be printed, FIG. 39 is a plan view of object drying apparatus of the invention, employed with the apparatus shown in FIG. 1, FIG. 40 is a sectional elevation view through the object drying apparatus taken along line 40—40 of FIG. 39, and FIG. 41 is a schematic plan view illustrating the manner in which an object is rotated as it is advanced through the drying apparatus of the invention.

DESCRIPTION OF THE PREFERRED EMBODIMENTS

1. Principal Apparatus Components and Their General Mode of Operation

Figure 1:
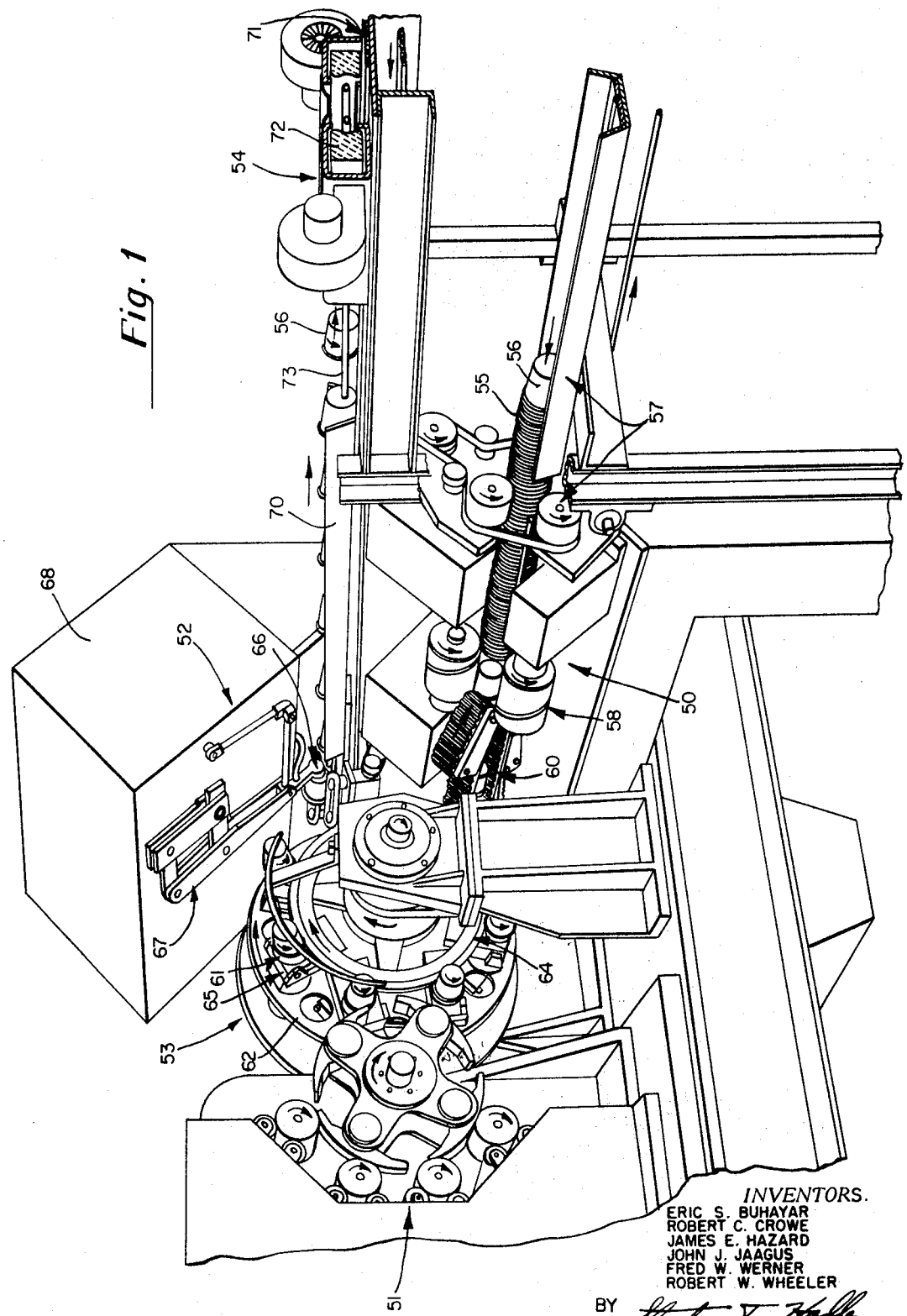
FIG. 1 is a perspective view of a specific embodiment of high speed continuous printing, treating, and handling apparatus of the invention.

FIG. 1 illustrates a preferred embodiment of high speed continuous printing, treating and handling apparatus of the invention. The apparatus illustrated in FIG. 1 is adapted for the decoration of the exterior surfaces of frusto-conical objects having tapered sidewalls and one open end such as plastic cups and the like. Such cups generally have a radially outwardly depending flange or bead which forms the lip of the cup. With slight modification of certain minor aspects in a manner which would be generally understood by one skilled in the art and as pointed out to some degree throughout this description, the apparatus can also be used to decorate the exterior surfaces of other types of cylindrical objects, including right cylindrical objects such as metal or plastic cans and the like. These objects generally have a peripheral raised strip or bead at one or both ends, allowing them to be handled in a similar manner.

The apparatus includes as elements thereof the following subassemblies, indicated generally by the respective reference numeral: object feeding apparatus 50, object printing apparatus 51, object removal apparatus 52, a turret assembly 53 for receiving objects from the object feeding apparatus 50 and for moving them past the object printing apparatus 51 to a position where they are transferred to the object removal apparatus 52 and object drying apparatus 54 arranged for receiving objects from the object removal apparatus 52 and for drying or curing decorating material applied to the surfaces of said objects by the object printing apparatus 51. In its broader aspects, the invention includes embodiments of the apparatus described above in which object printing apparatus 51 is replaced with other apparatus for treating the surfaces of objects while they are moved through the treatment in a supported condition by the other apparatus of the invention. For example, object printing apparatus 51 could be replaced by embossing apparatus for texturizing the surface of cylindrical objects such as cups to impart certain frictional or insulating characteristics.

The object feeding apparatus 50 shown in FIG. 1 includes stack advancing means 57, denesting means 58 and feeding means 60. The stack advancing means 57 receive a stack 55 of nested cups 56 arranged with their axes in a horizontal position and their open ends disposed in the direction in which they are to be fed. The stack 55 is urged forward toward turret assembly 53 by a portion of stack advancing means 57 to a point where the lips of cups 56 in the stack are frictionally engaged by another portion of stack advancing means 57 which causes the portion of the stack 55 preceding the gripped cups 56 to be advanced forward with a greater force than the remainder of the stack 55 and rotates the cups 56 in the preceding portion of the stack about their axes. Generally, the trailing portion of the stack is not rotated but is merely urged in a forward direction until gripped.

The lead cup 56 in the preceding rotating portion of the stack 55 is gripped at spaced points about its peripheral flange or lip by the denesting means 58 and separated from the next successive cup in the stack 55 by rapid advance in a forward direction at a rate substantially greater than the rate of advance of the trailing portion of the stack 55. The cup 56 thus separated from the stack 55 is gripped at spaced points about its peripheral flange by feeding means 60 and transferred in the forward direction to a point where it is received by cup support means 61 on the turret assembly 53. The placement of the cup 56 onto the cup support means 61 of the turret assembly 53 is accomplished at high speed in continuous motion and is facilitated by supporting the cup 56 to be placed upon the turret assembly 53 in a predetermined position by feeding means 60 prior to its placement and in a manner allowing movement of the cup 56 in the direction of motion of the cup support means 61 of the turret assembly 53 during the transfer.

The transferred cup 56 is then carried in a supported condition upon cup support means 61 of the turret assembly 53 through an orbital path along which the surface of the cup 56 is decorated and after which the cup 56 is removed from the turret assembly 53. Turret assembly 53 includes a rotatably mounted frame 62 upon which cup support means 61 are rotatably mounted in a manner permitting each cup 56 to rotate about its axis. Driving means (not shown) are provided to rotate frame 62. In addition, object rotate means 64 are provided which apply a rotational moment to cups 56 as they are carried through their orbital path. In some embodiments, means (described below with reference to FIGS. 32 and 33) are provided in the turret assembly 53 to move successive cups through a modified orbital path as they are carried past the object treatment apparatus to lengthen the interface time between the surface of the cup 56 and the object treatment apparatus while maintaining the cup 56 in continuous motion.

Where frusto-conical objects such as cups 56, as distinguished from right cylindrical objects, are being treated as shown in FIG. 1, by object printing apparatus 51 in continuous motion, the cups 56 are carried by the turret assembly 53 in a manner in which their rotational axes are inclined relative to the rotational axis of the turret assembly 53. In addition, axis control means 65 are provided to controllably alter the direction of inclination of the axes of the cups 56 as they are carried by turret assembly 53 past the object printing apparatus 51 along their orbital path and at least during that portion of their travel in which contact is had between the continuously moving surface of the cup 56 and the object printing apparatus 51. Axis control means 65 operate upon cup support means 61 to change the direction of inclination of the axes of the cups 56 relative to a given radial through the rotational axis of turret assembly 53. These provisions enable an image to be transferred from a cylindrical print blanket to the frusto-conical cup surface. In addition, object printing apparatus 51 is designed to enable contact with the continuously moving surface of the continuously moving cup 56 over a period of time in which the cup 56 is carried a discrete distance along its orbital path. This makes possible the treatment of the cup surface in continuous motion which is one of the significant features of the invention.

The cup is then carried along its orbital path to a point where it is contacted by the object removal apparatus 52. The closed end of the cup is engaged by object engagement means 66 of object removal apparatus 52. Object engagement means 66 is connected by linkage means 67 to an actuating means 68 which is designed to cause movement of a cup 56 carried by object engagement means 66 through a predetermined motion path to a conveying means 70. The cup is carried to a point where it is gripped by conveying means 70 at spaced peripheral points about its outwardly depending flange and deposited upon a surface also forming a portion of conveying means 70 for transfer to the object drying apparatus 54. During the removal of the cup 56 from the turret assembly 53, contact with the exterior sidewall of the cup is avoided so that the wet or uncured decorating material thereon is not smeared.

The cup 56 is then transferred to conveyor means 71 of the object drying apparatus 54 for drying or curing the decorating material on its sidewalls. In drying apparatus 54, the cup 56 is rotated about its axis while heat is applied by heating means 72 to its exterior surface, rotation being imparted to cups 56 by guide means 73 which move the cups transversely across conveyor means 71 during a portion of their travel. In some instances, decorating material is used which requires a combination of heating and cooling to dry, cure or set it, and certain embodiments of the apparatus include cooling means in the object drying apparatus 54.

2. Object Feeding Apparatus

FIGS. 1 and 2 through 4 illustrate the layout and arrangement of major components forming one embodiment of object feeding apparatus 50 of the invention. A stack 55 of nested cups 56 is disposed in a guide pan 74 with the open ends of the hollow cups 56 facing toward the turret assembly 53. Guide pan 74 has a bottom 75 and spaced upwardly diverging sidewalls 76 and 77 and forms an elongate channel having an open top. A bearing plate 78 having a centrally located longitudinal groove 80 in its upper surface is disposed upon the bottom 75 of guide pan 74.

Figure 4:
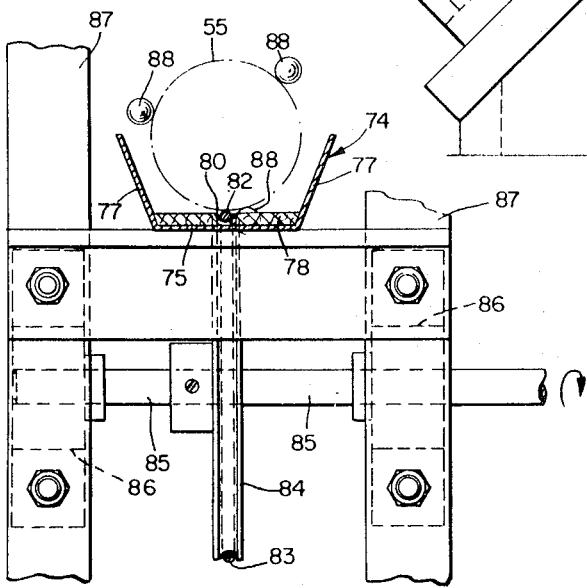
FIG. 4 is a sectional view through a portion of the stack advancing means of the object feeding apparatus taken along line 4—4 of FIG. 3.
Figure 8:
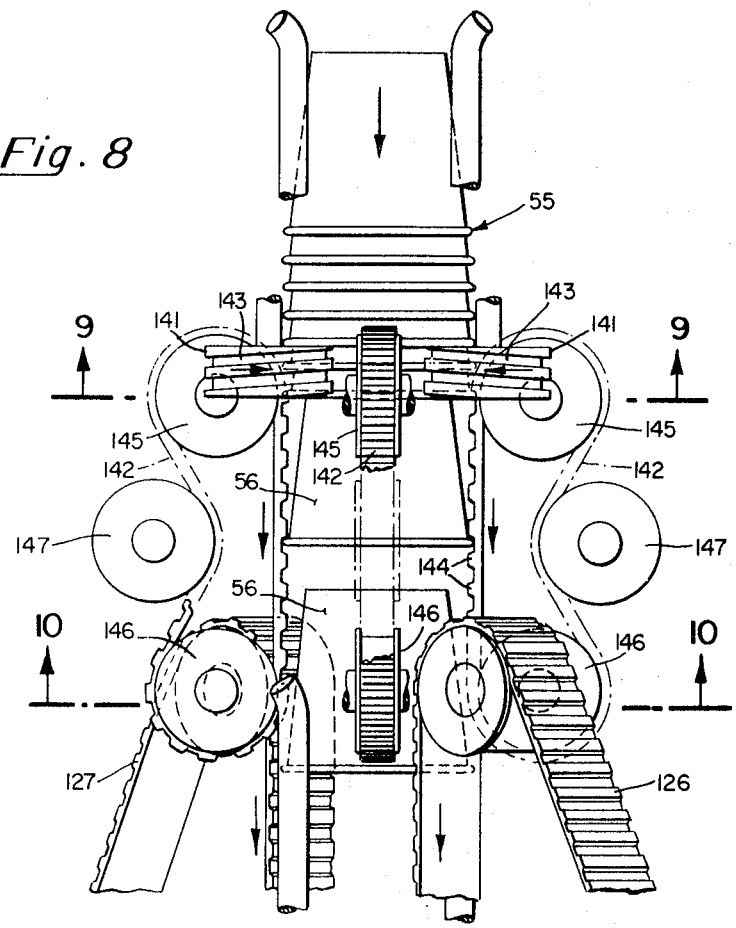
FIG. 8 is a schematic plan view of an alternative embodiment of denesting means for use in the object feeding apparatus of the invention.
Figure 11:
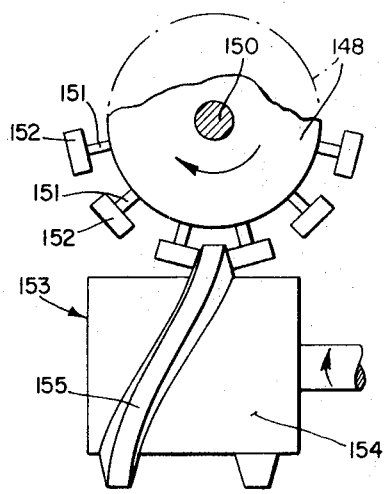
FIG. 11 is an elevation view, partly schematic, of a cyclical drive for the belts of the denesting means shown in FIG. 8.
Figure 9:
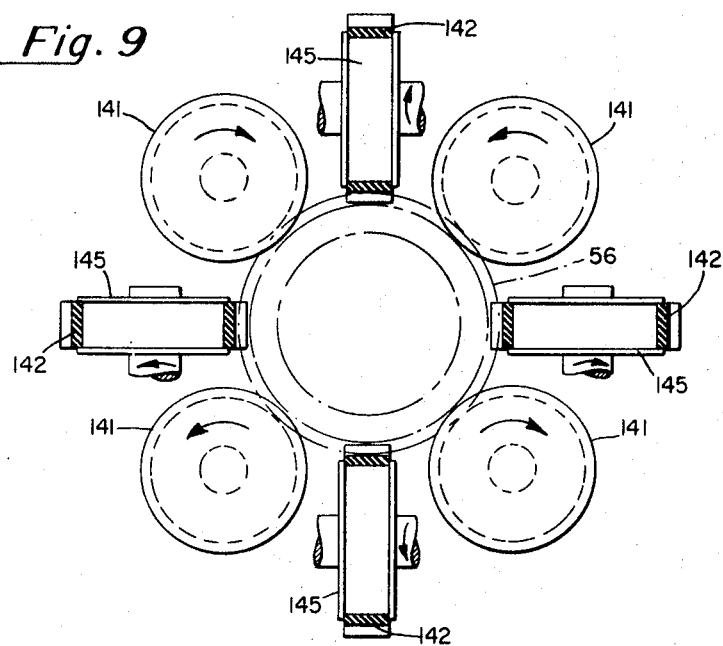
FIG. 9 is a sectional view through a portion of the denesting means taken along line 9—9 of FIG. 8, FIG. 10, is a sectional view through a portion of the denesting means taken along line 10—10 of FIG. 8.

One end of the first portion of stack advancing means 57 is shown in each of FIGS. 2 and 3 and in cross-section in FIG. 4. A cable conveyor 81 passes along the guide pan 74. The cable conveyor 81 has an upper flight 82 running in contact with the bearing plate 78 toward turret assembly 53 and a lower flight 83 returning in the opposite direction. The upper portion of the cable forming upper flight 82 is exposed above the surface of bearing plate 78 along the length of bearing plate 78 and the lower portion rides within the groove 80 beneath the surface of bearing plate 78. The cable conveyor 81, which passes around a grooved pulley 84 mounted upon a shaft 85 rotatably supported on spaced brackets 86 bolted to and carried by frame 87, is rotatably supported by another grooved pulley (not shown) in a similar manner at the opposite end and driven by a motor (not shown) connected to that pulley.

The upper flight 82 of cable conveyor 81 urges the stack 55 of cups 56 toward the turret assembly 53. Cups 56, which are disposed in nested relationship in a stack 55 and positioned on their sides in guide pan 74, frictionally contact the exposed portion of cable conveyor 81 with a portion of their peripheral flange or lip. In this manner, cable conveyor 81 frictionally engages the stack 55 and advances it with a relatively light force toward the denesting means 58 of the object feeding apparatus 50 and into a succeeding portion of stack advancing means 57. The pressure on the cups axially should be sufficient to close up any gaps between successive cups until limited by the configuration of the cups themselves. This insures continuity of feeding and operation of the object feeding apparatus. Guide means in the form of a plurality of rods 88 are positioned at the end of this portion of the stack advancing means 57 and generally define a passageway into and along which cups 56 are advanced. The stack 55 advanced by the cable conveyor 81 is supported by these guide rods 88 as it is fed through the remainder of the advancing means 57 and into the denesting means 58.

The succeeding portion of the stack advancing means 57 comprises a plurality of spaced-apart crowding rolls 90 arranged to contact peripheral portions of cups 56 in the stack 55 as it is carried by the guide rods 88 toward the denesting means 58. Crowding rolls 90 are disposed peripherally about the stack 55 of cups 56 between the end of guide pan 74 and the denesting means 58. The crowding rolls 90 are rotatably mounted on a frame 91 and have their axes directed at a slight angle to the path of the stack 55. The crowding rolls 90 have a cylindrical gripping portion 92 which contacts cups 56 in stack 55 and a grooved pulley portion 93 about which a drive belt 94 is arranged in partial wrapping engagement. Crowding rolls 90 are rotatably driven by belt 94 passing over a drive pulley 95, tension being supplied by guide pulleys 96 and 97. The crowding rolls 90 have their rotational axes arranged at a slight angle or skew to the path of the stack 55 of cups 56. Upon rotation of crowding rolls 90, both forward motion and rotational motion is imparted to the portion of the stack 55 preceding the cup 56 being gripped by crowding rolls 90, due to the circular array arrangement and skewed disposition of the crowding rolls 90 about stack 55.

Cups 56 in the portion of stack 55 between crowding rolls 90 and denesting means 58 are under axial pressure which insures that cups 56 in that portion of stack 55 are rotated and fed under substantial positive force into denesting means 58. Denesting means 58 determine the number of cups 56 passing through the object feeding apparatus 50 and cup feeding continuity is insured by feeding cups into denesting means 58 with substantial force. The cable conveyor 80 advances the stack 55 into the crowding rolls 90 which advance it at a slower speed toward the denesting means. Thus, cable conveyor 80 runs at a slightly higher speed than that of the stack 55, some slippage of cups 56 occurring upon upper flight 82. This insures that the cups 56 in stack 55 will be completely nested without any spaces or gaps. Any slippage which must occur in feeding the stack 55 into denesting means 58 takes place within crowding rolls 90 although resistance to slippage is greater here resulting in the greater axial pressure.

Figure 5:
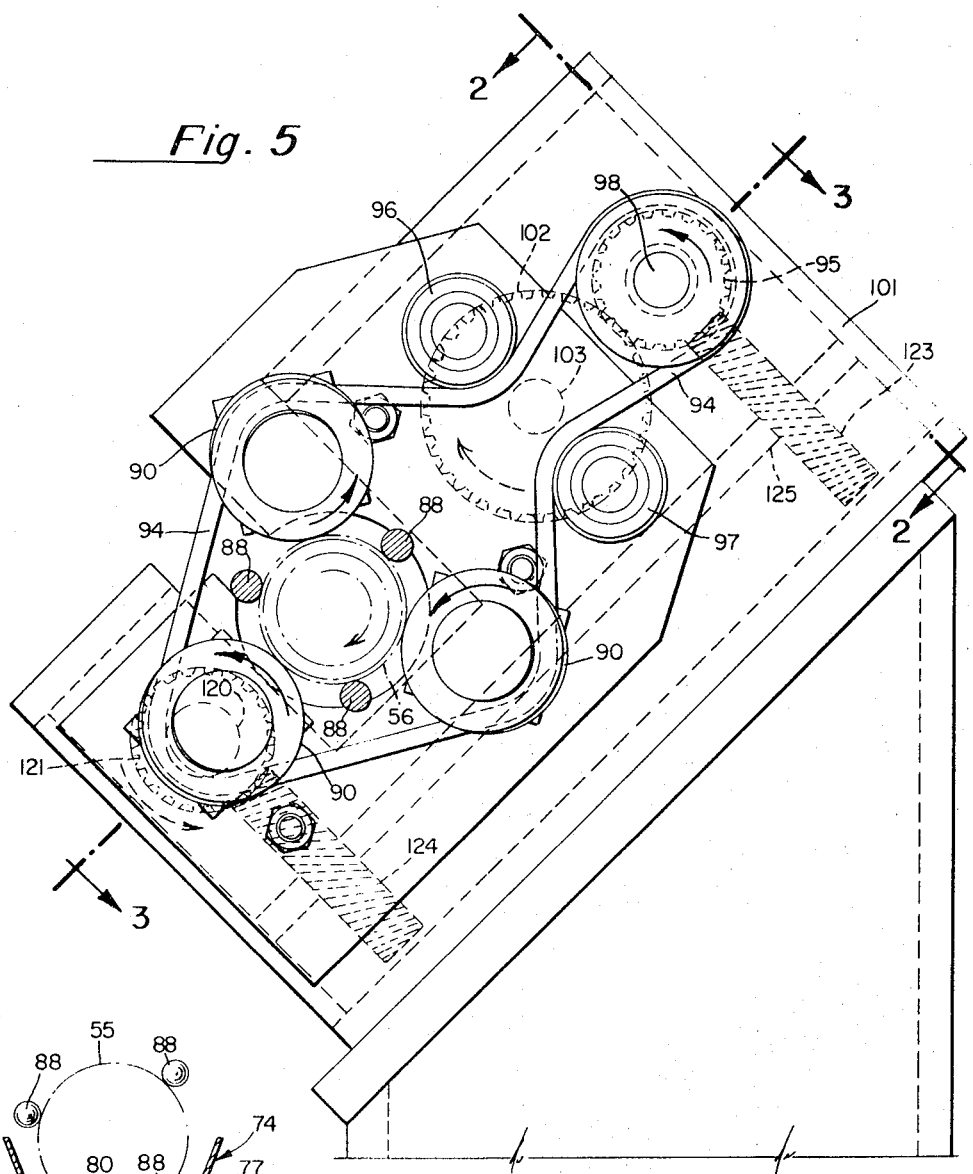
FIG. 5 is a sectional view taken along line 5—5 of FIG. 3, illustrating another portion of the stack advancing means of the object feeding apparatus and the drive for portions of the denesting means and the stack advancing means.

The details of the crowding roll drive are most clearly shown by FIGS. 2, 3 and 5. Drive pulley 95 is connected through a shaft 98 to a gear 100 inside a drive housing 101. Gear 100 is driven by a gear 102 connected to a shaft 103. Shaft 103 is driven through a pair of flexible couplings 104 and 105 by a main drive shaft 106 passing through a drive housing 107 and connected through pulley 109 by a belt 108 to a motor (not shown).

The denesting means 58 include a plurality of helically grooved feeder rolls 110 which are peripherally disposed about the path of the stack 55 of cups 56 between the ends of the guide rods 88 and the feeding means 60. The feeder rolls 110 are spaced relative to one another so that spaced peripheral portions of the objects being fed, such as portions of the lips of the cups 56, are simultaneously grasped by the helical groove 111 in each respective feeder roll 110 and controllably advanced along a path toward turret assembly 53 upon rotation of feeder rolls 110.

The helical groove 111 on the feeder rolls 110 is constructed in a manner whereby initial advance of the cups 56 is at a speed which closely approximates the speed of advance of the stack 55 of cups 56 while the remaining portion of the cup advance is at a progressively increased speed. Thus, helical grooves 111 are of substantially constant depth but have a pickup portion 112 of relatively low pitch or helix angle which portion first receives cups 56 from the stack 55 being advanced by the stack advancing means 57, and an accelerating portion 113 of increasing pitch or helix angle generally greater than that of the pickup portion. Feeder rolls 110 are adapted to increase the speed of cups 56 fed thereto relative to the speed of the stack 55 and to accelerate them up to the speed of the cup feeding means 60, which combine with feeder rolls 110 to effect separation of successive cups 56 from stack 55. Relative to the feeding of cups 56 to printing apparatus for decoration of their sidewalls, the separation achieved by cooperation of denesting means 58 and feeding means 60 should be at least equal to the length of a cup so that the entire sidewall is exposed and the closed end of the leading cup 56 is at least removed from the interior of the succeeding cup 56. Preferably, the width and shape of the helical groove 111 in each roll 110 varies with the pitch of the helical groove 111 along the length of the feeder roll 110 to closely accommodate the engaged peripheral portion of the objects being grasped and advanced by the groove 111.

The feed rolls 110 are operated at constant speed and have their helical grooves 111 oriented relative to one another so that spaced peripheral portions of an object disposed between the rolls 110 and being advanced and denested from stack 55 by the rolls 110 simultaneously contact corresponding portions of each helical groove 111 in each feed roll 110. In this manner, the forwardmost object in the stack of objects being advanced is initially grasped by the feeder rolls 110 by insertion of peripherally spaced-apart portions of its outermost flange or lip into the helical groove 111 of each respective feeder roll 110. The rotation of the stack 55 by the crowding rolls 90 assists in the insertion of the periphery of the object into the grooves of the feed rolls 110. Upon rotation of the feeder rolls 110, the grasped object is propelled forward at a rapidly accelerated speed by sliding within the grooves 111 while it is rotated by the rotational movement of the feed rolls 110. The increasing pitch of helical grooves 111 causes the object to be moved much more rapidly in a forward direction than the remainder of the stack 55, resulting in some separation or denesting of the object from stack 55. This separation enables the cup 56 to be engaged separately by feeding means 60 and to be further separated from succeeding cups as desired.

The upper two feeder rolls 110 shown in FIG. 2 are rotatably mounted on shafts 114 and 115 connected to gears 116 and 117 driven by a drive gear 118 connected to the shaft 106. The lower feeder roll 110 shown in FIG. 3 is driven by a shaft 120 fixedly secured to gear 121 carried within the lower portion of drive housing 101. FIG. 5 shows in greater detail the arrangement of the drive mechanism for the lower feed roll 110. The helical gear 121 is rotatably driven by the helical gear 102 through a helical gear 95 and a pair of helical gears 123 and 124 connected by a shaft 125. The whole drive housing 101 can be moved as indicated by the arrow in FIG. 3, thereby changing the position of the lower feed roll 110 relative to the upper two feed rolls 110 so as to allow spacing adjustment of the denesting means 58 to accommodate articles of slightly varying size. As will be apparent from the above description, the spacing of the feed rolls 110 is important in the proper adjustment of the denesting means 58. The cups 56 must be held firmly between the feeder rolls 110 to achieve positive feeding and yet not so firmly as to damage the cup or substantially inhibit its sliding movement along helical grooves 111. Preferably, a flexible cup 56 held in the denesting means 58 by feeder rolls 110 will be slightly distorted from its normal or unflexed shape when the feeder rolls are properly spaced and adjusted.

At the exit end of the denesting means 58, the separated object or cup 56 is advanced into the object feeding means 60 of the apparatus. Feeding means 60 include a pair of conveyor belts 126 and 127 having object gripping means in the form of transverse upstanding ribs 128 carried on their outer surface which are disposed opposite to one another in spaced relation with their opposing flights being arranged for movement in the same direction. Ribs 128 form spaced transverse grooves 129 in the outer surfaces of belts 126 and 127 which receive the peripheral flanges of objects, such as the lips or beads of cups 56. The conveyor belts 126 and 127 are arranged to receive cups 56 held by the exit end of the feeder rolls 110 and to grasp each cup 56 as or before it is released by the feeder rolls 110 so as to advance it to a remote position. Belts 126 and 127 are held in position between spaced sets of rotatably mounted pulleys 130 and 131, tension being applied by tension pulleys 132, and the belts 126 and 127 being driven by drive pulleys, 133 and 134, respectively. The spacing between opposed flights of belts 126 and 127 is maintained by belt guides 119 and 122 disposed behind the opposed flights of belts 126 and 127 and generally in contact with the back sides thereof.

Belts 126 and 127 are driven at an equal and constant speed which is higher than that of the stack 55. The speed of belts 126 and 127 is substantially equal to the speed of a cup 56 at the exit end of feeder rolls 110. This enables belts 126 and 127 to further separate a cup 56 from succeeding cups held within feeder rolls 110 since they move it ahead at high speed during the time the succeeding cup is being accelerated to that speed.

FIGS. 2, 6 and 12 illustrate in greater detail the position of the conveyor belts 126 and 127 relative to the feed rolls 110 and also illustrates the manner in which the conveyor belts 126 and 127 are driven. A pair of helical gears 135 and 136 are driven by a helical gear 137 carried by the drive shaft 106 and drive shafts 138 and 139 connected to conveyor belt 126 and conveyor belt 127 through drive wheels 133 and 134, respectively. At this point it can be seen that a precise constantly timed relationship is maintained between crowding rolls 90 of the stack advancing means 57, the denesting means 58 and the feeding means 60 since all of these mechanisms are driven positively by one drive motor (not shown) through belt 108.

FIGS. 7 through 10 illustrate an alternative embodiment of denesting means 58 for use in object feeding apparatus 50 of the invention. The denesting means 58 illustrated include a plurality of peripherally disposed helically grooved feeder rolls 141, which are generally of shorter length than feeder rolls 110 utilized in the embodiment described with reference to FIGS. 2 and 3, in combination with a plurality of peripherally disposed conveyor belts 142, four being shown, which are cyclically operated. The helical grooves 143 in feeder rolls 141 have a relatively low constant pitch which is sufficient to slightly separate cups 56 received at the end adjacent the ends of guide rods 88 and the stack advancing means 57 from succeeding cups 56 in stack 55. Thus, cups 56 being moved by feeder rolls 141 by grasping of spaced peripheral portions within the helical grooves 143 are advanced at a slightly higher speed than succeeding cups 56 in stack 55, resulting in slight separation from the stack over the short length of travel in the feeder rolls. Feeder rolls 141 serve to positively feed cups 56 into conveyor belts 142. The slightly separated cups 56 are then gripped by upstanding ribs 144 on cyclically operated conveyor belts 142 which are adapted to match the speed of a cup 56 held in feeder rolls 141 when receiving a cup, and to match the higher speed of feeder belts 126 and 127 when transferring a cup 56 to them, thus effecting complete denesting or separation of the cups from one another.

Conveyor belts 142 are arranged in partial wrapping engagement with wheels 145 and 146 and driven by intermediate wheels 147. The arrangement of the feeder rolls 141, conveyor belts 142, and the conveyor belts 126 and 127 forming a portion of the feeding means 60 is shown more clearly in FIGS. 9 and 10.

Figure 10:
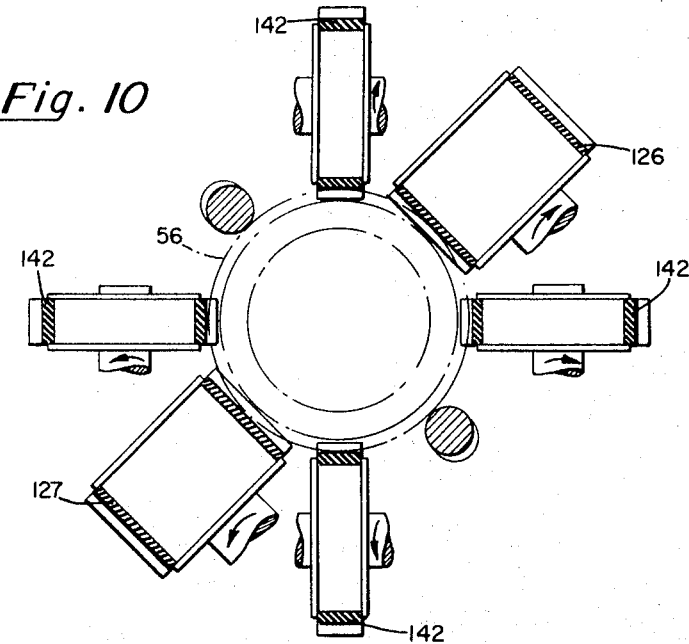

FIG. 10 illustrates one mechanism for providing a cyclical drive to conveyor belts 142 to effect the very short cycling time which is required to obtain rapid separation of denesting of cups in a cup feeder of the type disclosed. A rotatably mounted wheel 148 connects to a shaft 150 which is operably connected to each of the drive wheels 147 which turn the conveyor belts 142. The wheel 148 has a plurality of arms 151 extending radially outward therefrom carrying a rotatable follower wheel 152 on their ends. A ridge cam 153 which comprises a cylinder 154 having an upstanding helical rib 155 extending radially outward therefrom is driven by a motor (not shown). The upstanding helical rib 155 is disposed between two adjacent arms 151 so as to contact the follower wheels 152 thereon. By varying the pitch of the helical rib 155, the spacing between the follower wheels 152, and the diameter of the cylinder 154 as well as the rate of its rotation, complete flexibility can be achieved in a cycling operation. For example, the above-described apparatus may be designed to rapidly accelerate the belts 142 to transfer a cup 56 to the conveyor belts 126 and 127, and then to quickly decelerate the belts 142 to allow their succeeding portion to pick up another cup 56 from feeder rolls 141. Thus, it can be seen that the apparatus illustrated in FIG. 10 is a suitable mechanical device for cycling the operation of belts 142 which may be operated at sufficiently high speeds to denest cups 56 at the rate of 1,000 or more per minute.

FIGS. 12 through 16 illustrate a specific embodiment of the invention in which the apparatus is adapted to feed objects such as cups 56 to a remote point and to place them onto successive continuously moving mandrels 140 passing through the path of the cups 56 in an orbit perpendicular thereto. FIG. 7 is a sectional view illustrating the maximum lateral movement of the cups 56 which occurs during forward movement of the cups 56 onto the mandrel 140 during placement. The dotted line indicates the position of a cup 56 before contact by a mandrel 140 while the solid line indicates the position of a cup 56 after placement and at the time of release by belts 126 and 127. Thus, during the time a cup 56 moves in the direction of the orbital path of a mandrel 140 for the distance shown, it has been advanced by feeding means 60 for a distance approximating one cup length.

This lateral movement is permitted by providing ribs 128 extending transversely across the conveyor belts 126 and 127 which support the cups 56 so that their axis is upwardly inclined at a slight angle relative to the axis of the mandrel 140. This inclination is illustrated in FIG. 13. The degree of such inclination of a cup axis can be controlled by the spacing of ribs 128 on belts 126 and 127 and the width of the engaged portion of the cup 56. The inclination is caused by gravity but might be assisted by other means such as an air jet (not shown). The inclination also permits the entrance of the mandrel into the cup initially without catching the upper lip of the cup which is initially drawn away from the mandrel by the inclination of the cup. The transverse ribs 128 also allow the cups 56 to slide across the conveyor belts 126 and 127 in the direction of movement of the mandrel 140 during placement thereon without affecting the speed or degree of advance of the cups 56 onto the mandrel 140. FIGS. 6 and 7 show how the cups 56 are preferably placed into the grooves between ribs 128 of the conveyor belts 126 and 127 close to one side of the conveyor belts. This feature is also illustrated in FIG. 13 which shows the angle of tilt of the axis of the cups 56 and the manner in which they are gripped by the conveyor belts 126 and 127 and held within the grooves 129 between ribs 128.

FIGS. 14A through 14D illustrate in greater detail the sequential steps which occur in placement of the cups 56 onto the mandrel 140. Initially, as shown in FIG. 14A, a cup 56 is moved toward an oncoming mandrel 140. The cup 56 is held between belts 126 and 127 in a manner whereby peripheral portions of the cup are gripped by the portions of the belts closely adjacent to the top edge of the belts. The movement of the belts 126 and 127 is accurately timed with the movement of mandrel 140 so that the upper edge of the open end of the cup 56 just clears the upper edge of the oncoming mandrel 140. The tilting of the cup as it is held within the grooves 129 of the belts 126 and 127 gives additional clearance between the cup and the mandrel. FIG. 14B shows a subsequent stage in the placement in which the cup 56 is partially inserted upon the mandrel 140 and has been moved laterally across belts 126 and 127 while being held within grooves 129 due to movement of mandrel 140 along its orbital path and contact with the lower side of cup 56. The cup is no longer inclined but is substantially axially aligned with the rotational axis of mandrel 140. FIG. 15 shows the position of a cup relative to belts 126 and 127 in greater detail. FIG. 14C shows a still more subsequent stage in the placement process in which a cup 56 is almost completely placed upon mandrel 140 and is about to be released by belts 126 and 127. It should be noted that the cup has been moved laterally completely across belts 126 and 127 by the action of mandrel 140 moving along its orbital path. FIG. 16 illustrates the position of cup 56 on mandrel 140 relative to grooves 129 in belts 126 and 127 at this stage of the placement. FIG. 14D illustrates the last stage of the placement process in which a cup 56 is completely placed upon a mandrel 140. In some instances, where placement of the cups 56 is not completed prior to release of the cups 56 by the conveyor belts 126 and 127, vacuum applied to the interior of the cup through a passageway in the mandrel 140 or air pressure as by a jet of compressed air applied against the closed end of the cup 56 from the exterior or both are utilized to fully seat the cup on the mandrel 140.

The above-described object feeding apparatus might be used to feed frusto-conical objects having a geometric configuration different from the cups 56 shown. In the absence of a peripheral flange or lip, the radially outermost portion of the sidewall of the object could be engaged. Similarly, the apparatus could be used to feed right cylindrical objects such as cans from a line or stack by engagement of the raised strip or bead formed by the junction of the end and the sidewall of the object.

3. Turret Assembly

FIGS. 17 and 18 illustrate in greater detail the turret assembly 53 of the invention by means of which cups 56 disposed upon mandrels 140, shown in greater detail in FIG. 21, are carried in a circular orbital path through a treatment process, such as printing. Thus, the orbital path has a pickup section 160 in which cups 56 are placed upon mandrels 140, a rotate section 161 in which the mandrels 140 and the cups 56 carried thereon have spin imparted to them so that they rotate about their axis as they are carried through the orbital path, a treatment section 162 in which the surface of the cups 56 is treated as by printing or decorating, and a removal section 163 in which cups 56 are moved from mandrels 140 and transferred to a remote point. These sections are indicated in FIG. 17 for the process performed by the apparatus shown in FIG. 1.

The apparatus shown in FIGS. 17 and 18 is adapted for the printing of the external sidewalls of frusto-conical objects such as plastic cups 56. Thus, the mandrels 140 are mounted for rotation about axes disposed at a slight angle of inclination to the rotational axis of the frame 62 in a direction generally radially outward from the rotational axis of the frame 62. In addition, mandrel axis control means 65 are provided for altering the direction of inclination of the rotational axis of the mandrels 140 with respect to a given radial extending from the rotational axis of the frame 62 as the mandrels 140 are carried through the object treatment section 162 of the orbital path. FIG. 18 illustrates one type of mandrel axis control means 65.

FIGS. 17 and 18 also illustrate mandrel tilt angle control means 165 for controlling the angle of inclination of the mandrel axis relative to the rotational axis of the frame 62. Mandrel tilt angle control means 165 also enable withdrawal of mandrels 140 radially inward toward the rotational axis of frame 62 and out of contact with treating apparatus when no object is carried on mandrel 140, the above being controlled by a pneumatic system which is described below. Details concerning the mandrel tilt angle control means 165 and their operation are described in greater detail below with reference to FIGS. 21, 22 and 27.

Figure 26:
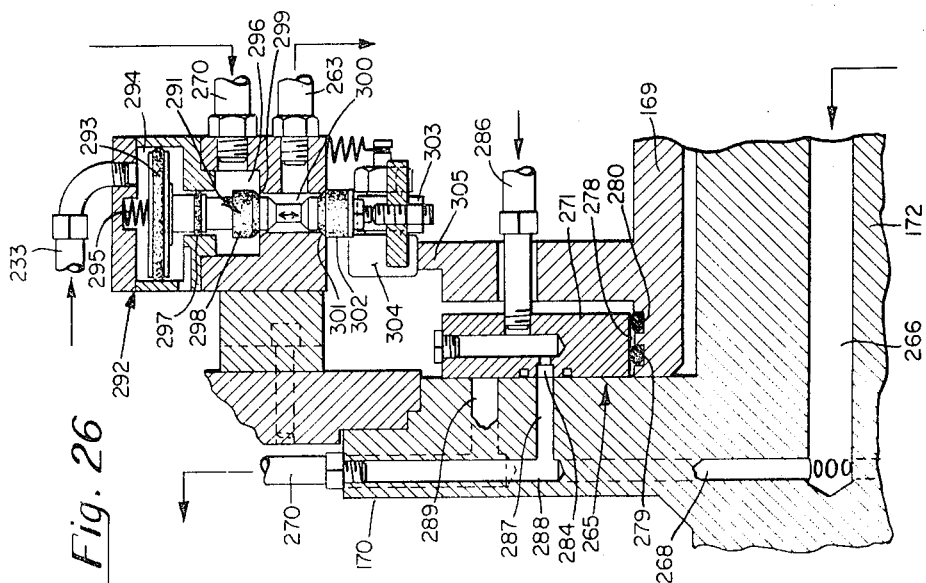
FIG. 26 is a sectional elevation view of a control valve taken along line 26—26 of FIG. 19.
Figure 27:
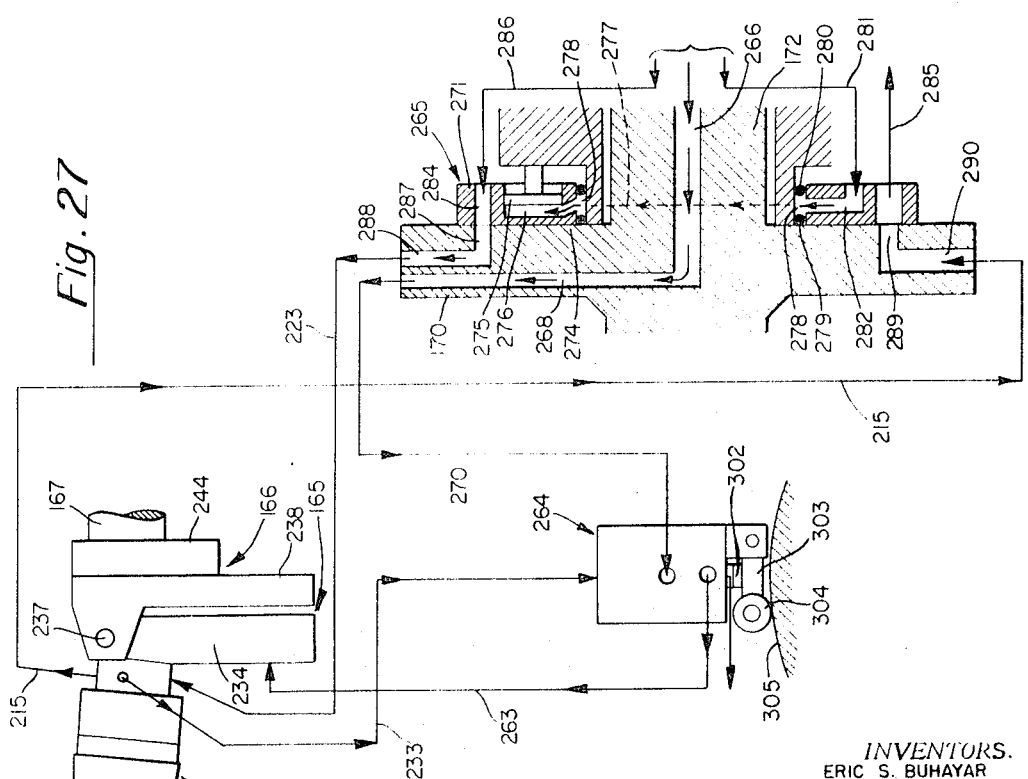
FIG. 27 is a schematic flow diagram of a pneumatic system employed in the apparatus of the invention.

A pneumatic system, schematically illustrated by FIG. 27, and illustrated in part by FIGS. 18, 21 and 23 through 26, is provided in the turret assembly 53 to control the gripping of cups 56 by the mandrels 140 as mandrels 140 move through the object rotate section 161 and the object printing section 162 of their orbital path. The pneumatic system also provides a means for releasing cups 56 from the mandrels 140 after they pass through the printing section 162 of the orbital path and before they arrive at the object removal section 163 of the orbital path. The gripping function is performed by a vacuum system operating through openings in the surface of mandrel 140 which holds the cup 56 firmly to the surface of the mandrel 140 and the removal function is accomplished by supplying pressurized air to the interior of the cup 56 through a passageway in mandrel 140 to blow it at least partially off of the mandrel 140. The pneumatic system of turret assembly 53 also provides a means for detecting the presence or absence of a cup 56 on mandrel 140. An abutment member 164, shown clearly in FIG. 1, is disposed adjacent the closed ends of cups 56 carried by mandrels 140 through the section of the orbital path between the printing section 162 and the object removal section 163. This abutment member 164 limits the extent of removal of cups 56 from the mandrels 140 by the application of compressed air to their interiors until they have been placed in a position where they will be engaged by object removal apparatus 52.

Referring now to FIGS. 17 and 18, each mandrel 140 is attached to a mandrel supporting assembly 166 which is carried on the ends of a shaft 167 which is rotatably mounted on a turret plate 170 spaced apart from another turret plate 171. Plate 170 forms a portion of the rotating frame 62 of the turret assembly 53 of the invention. Plate 170 is fixedly secured to a radial flange 168 of an axle 172 which is rotatably journaled in bearings 173 and 174 carried on end support members 175 and 176. Turret plate 171 comprises a radial flange of a hub member 169 secured by bolts to end support member 176. A portion 177 of axle 172 extending beyond end support member 176 is keyed to a drive wheel 178 mounted thereon about which a toothed timing belt 180 is arranged in partial wrapping engagement. The belt 180 connects wheel 178 to a drive motor (not shown) to drive axle 172. A second drive wheel 181 mounted upon and keyed to portion 177 of axle 172 is connected by a toothed timing belt 182 to a printer unit 51 which forms the treatment apparatus of the embodiment shown and is described below.

Between turret plate 170 and end support member 175, a portion of axle 172 carries a cylindrical sleeve 183 which is eccentrically mounted about the axle 172 and secured to end support member 175 having been positioned from annular flange 184 extending about axle 172 from end support member 175 by means of set screws 185 and 186 acting against flange 184. By adjusting set screws 185 and 186, it is possible to control the degree of eccentricity. Cylindrical sleeve 183 carries bearing assemblies 187 and 188 upon which is rotatably mounted a second cylindrical sleeve 190 having a radially outwardly depending peripheral flange 191 connected to sleeve 190 by a spider 189 forming a portion of the object rotate means 64 for imparting rotation or spin to the mandrels 140. Cylindrical sleeve 190 is driven by a poly-V-belt 192 which is carried in partial wrapping engagement therewith and extends to a drive wheel (not shown) fixedly mounted on a drive shaft (not shown) connected through a speed control device (not shown) to a drive motor (not shown). Flange 191 has a peripheral strip 193 of elastomeric rubber-like material which has a relatively high coefficient of friction. The outer peripheral surface 194 of strip 193, which contacts the mandrels 140 as they are carried through the object rotate portion 161 of their orbital path, is slightly beveled to conform with the shape and inclination of the portion of the mandrel 140 contacted which, in the case of frusto-conical objects, such as cups 56, is inclined outwardly, as shown in FIG. 18.

Mandrel 140 and mandrel supporting assembly 166 are carried on the end of shaft 167 which is rotatably journaled by bearings 195 and 196 in the outer periphery of rotatable turret plate 170. The rotational axis of shaft 167 is parallel with the rotational axis of frame 62 while, as pointed out above, the rotational axis of mandrel 140 is inclined radially outwardly from the rotational axis of frame 62.

Figure 19:
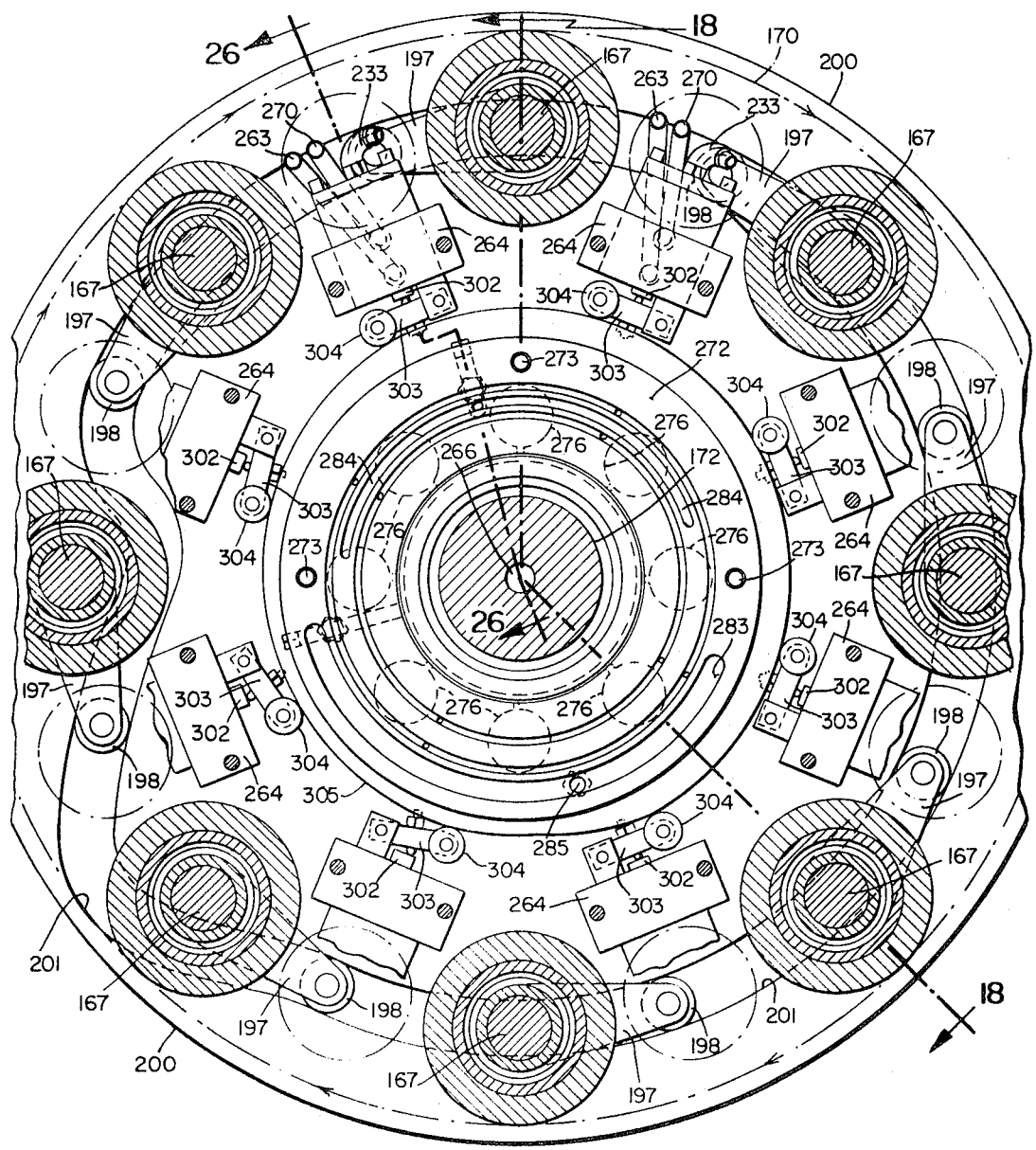
FIG. 19 is a sectional view taken along line 19—19 of FIG. 18, illustrating the manner in which the control valves are cam actuated.

FIGS. 18 and 19 illustrate one means for controlling the direction of inclination of the rotational axis of the mandrel 140 as it is carried through a portion of its orbital path. The mechanism shown in FIGS. 18 and 19 changes the direction of inclination of the mandrels 140 by rotating the shaft 167 about its axis in a controlled manner during the treatment selection 162 of the orbital path. Shaft 167 has an arm 197 attached to its end remote from the mandrel 140 which carries a follower wheel 198 in rotation thereon. A cam plate 200 is fixedly secured to stationary turret plate 171. Cam plate 200 has a camming groove 201 cut into its surface which faces and receives follower wheel 198. The follower wheel 198 rides in camming groove 201 which follows a predetermined path thus controlling the pivotal movement of the shaft 167 about its axis by means of arm 197. During the portion of the orbital path when the cup 56 carried on the mandrel 140 is being treated, the groove 201 follows a path other than circular which is predetermined to direct the inclination of the mandrel axis in a prescribed manner.

FIG. 21 illustrates in greater detail the construction of mandrel support means 166 and the mandrel 140 itself. Mandrel 140 includes a stationary inner core 202 having a tip portion 203 of smaller diameter, a central portion 204 of larger diameter and a base portion 205 of a smaller diameter terminating in peripheral threads 206 about the end of base portion 205. A mandrel shell 207 is rotatably carried on stationary core 202 by means of bearing assemblies 210 and 211. Shell 207 has a tapered portion 212 made of two or more pieces fastened together which is adapted to receive a hollow frusto-conical object such as a cup 56, and a cylindrical portion 213 adjacent central portion 204 of core 202 which is attached by bolts 214 to tapered portion 212 so as to rotate therewith. The object rotate means 64 shown in FIG. 1 and, more specifically, as flange 191 and strip 193 in FIG. 18, contact the surface of cylindrical portion 213 of mandrel shell 207 to impart rotation to the mandrel 140 and an object carried thereon.

FIGS. 23 through 25, in conjunction with FIG. 21, illustrate the configuration of passageways through mandrel 140 which allow the flow of air through the mandrel 140 to the interior of a cup 56 carried thereon for purposes to be described.

In the apparatus shown in FIG. 1, it has been found desirable to provide means for applying vacuum through the mandrel 140 to the interior of the cup 56 carried thereon prior to its passing through the object rotate section 161 and the object treatment section 162 of its orbital path to seat and firmly hold the cup 56 on the tapered surface 212. Vacuum enters through a conduit 215 which is secured to central portion 204 of core 202. Core 202 has a passageway 216 extending along its rotational axis from the point where conduit 215 enters to the end of tip portion 203. The passageway 216 is divided into three sections 217, 218 and 220 along a portion of its length through central portion 204 by a T-shaped insert 221 shown more clearly by sectional views in FIGS. 23 and 24. The passageway 216 is divided into two portions 217 and 218 by the extension of insert 221 through the tip portion 203 of core 202 and opening out into a concave recess 222 in the end of tapered portion 212 of mandrel shell 207, as shown in FIG. 25. Before the mandrel 140 is carried through the object rotate section 161 of the orbital path, vacuum is applied through conduit 215 and through section 217 of passageway 216 to create a vacuum within recess 222 between the closed end of a cup 56 on the mandrel 140 and the surrounding surface of mandrel shell 207. This causes a cup 56 to be drawn tightly into frictional engagement with tapered surface portion 212 of mandrel 140.

Additionally, it has been found desirable to apply air pressure through the mandrel 140 to the space between the tapered surface 212 of the mandrel shell 207 and the interior surface of a cup 56 carried thereon as well as to concave recess 222 to assist in stripping or removing the cup 56 from wedged engagement with the tapered surface 212 of the mandrel shell 207 prior to its reaching the object removal section 163 of the orbital path. Thus, compressed air is fed through a conduit 223 which connects with passageway 216 through central portion 204 of core member 202. Compressed air is fed into section 220 of passageway 216 and flows through the passageway 216 into an annular passageway 224 by means of a radial passageway 225 through core 202. This arrangement allows continuous flow of compressed air from stationary core 202 into radial holes 226 in rotating shell member 207 leading to an annular chamber 227 within shell 207. Annular chamber 227 connects to an outer annular chamber 228 within shell 207 by means of inclined passages 230. Compressed air fed to passageway 216 and introduced into outer annular chamber 228 is emitted laterally outwardly by means of a radial gap in shell 207 to grooves 231 running toward the end of tapered portion 212 of shell 207. The grooves 231 are recessed into the surface of the tapered portion 212 of shell 207, allowing the passage of compressed air beneath the inner surface of a cup 56 disposed thereon. The grooves 231 do not extend toward cylindrical portion 213 of shell 207 as far as the end of a cup 56 disposed on the tapered portion 212 of the rotatable shell 207. Longitudinal passageways 232 also connect outer annular chamber 228 with the concave recess 222 at the end of rotatable shell 207 to allow direction of compressed air fed therethrough against the closed end of a cup 56 disposed on tapered portion 212. The combination of air flowing along the sides of the cup 56 as well as air directed against the end of the cup 56 acts to release the cup 56 from its wedged disposition on the tapered portion 212 of the rotatable shell 207 to facilitate its removal from the mandrel 140.

Furthermore, it has been found desirable to provide a third passageway system operating through the mandrel 140 to enable a fluid pressure detection system (described below) to operate and to determine the presence or absence of a cup 56 on the tapered portion 212 of the mandrel shell 207. Should a cup 56 be missing from a mandrel 140, the detection system acts to withdraw the mandrel 140 radially inwardly toward the rotational axis of the turret assembly 53 so that contact of the mandrel with the treatment apparatus is avoided. A conduit 233 is connected to passageway 216 through central portion 204 of core 202. Conduit 233 connects to section 218 of passageway 216 and opens into the concave recess 222 between the end surface of rotatable mandrel shell 207 and the closed end of a cup 56 carried thereon. If a cup 56 is present on the mandrel 140, upon the application of a vacuum pump (not shown) to conduit 215, a vacuum will be quickly created in section 217 and at the outer end of passageway 216 and also in section 218 and conduit 233. However, if no cup 56 is present on the mandrel 140, the application of a vacuum pump to conduit 215 will not create a vacuum in section 218 of passageway 216 or in the conduit 233. The application of the vacuum created in conduit 233 through the above arrangement to prevent withdrawal of the mandrel 140 radially inward toward the rotational axis of the turret assembly 53 is described below.

The base portion 205 of core 202 is inserted through a hole through a pivotal member 234 and secured thereto by a threaded nut 235 engaging peripheral threads 206 and bearing against a lock washer 236. Pivotal member 234 is pivotably connected at one end by a pin 237 to a base member 238, the pivotal member 234 and the base member 238 comprising a portion of the mandrel support assembly 166. The pivotal member 234 is connected at its opposite end to the base member 238 by bolts 240 passing through the members 234 and 238. The end 241 of each bolt 240, seated within pivotal member 234, retains a compressed spring 242 which urges the end of pivotal member 234 toward base member 238.

The base member 238 is slideably mounted by a keyway 243 upon a fixed plate 244 secured to the end of mandrel shaft 167. A bolt 245 is threadedly engaged with fixed plate 244. By loosening the bolt 245, free sliding movement is permitted between base member 238 and fixed plate 244, restricted only by adjusting element 246 having shoulders which engage base member 238 and coacting with threads 247 on fixed plate 244 to radially advance or withdraw base member 238 and mandrel 140 carried thereon relative to the rotational axis of turret assembly 53.

Referring back to FIG. 21, the mandrel tilt angle control means 165 will now be described. Pivotal member 234 contains a cylinder 250 in its surface facing base member 238 in which is positioned a piston 251 carrying a peripheral seal 252 which rides in sealing contact with the walls of the cylinder 250. A tapered back snap ring 253 is peripherally mounted in a groove 254 about the open end of the cylinder 250. The snap ring 253 serves to limit movement of piston 251 toward the outer end of cylinder 250. Piston 251 carries a ball 255 in a seat 256 on its end facing base member 238 which bears against a tapered block 257 bearing on an inclined surface 258. Details as to the construction and operation of this tapered block 257 are shown more clearly in FIG. 22. The position of the tapered block 257 may be adjusted by set screws 260 and 261 so as to alter the position of the upper surface 262 of tapered block 257 against which the ball 255 bears. A conduit 263 leads into cylinder 250 between pivotal member 234 and piston 251. In response to insertion of compressed air into the cylinder 250 through the conduit 263, piston 251 is forced toward base member 238 until it contacts snap ring 253 and ball 255 is held against tapered block 257 in base plate 238. This forces pivotal member 234 away from base member 238 overcoming the urging force exerted by springs 242. This results in the movement of the mandrel 140 radially outward from the rotational axis of the turret assembly 53. The tilt angle of mandrel 140 is controlled by adjustment of tapered block 257 as described above. The application of compressed air to cylinder 250 through conduit 263 is controlled by a pneumatic system described below.

A pneumatic system, which is utilized in the turret assembly 53 of the invention to provide pressure or vacuum to various portions of the apparatus to control its operation, is schematically illustrated in FIG. 27. The system includes a control valve 264 for controlling the operation of piston 251 within cylinder 250 and, correspondingly, the radial position of mandrels 140 with respect to the rotational axis of turret assembly 53 in response to the presence or absence of a cup 56 on the mandrel 140 during a portion of the orbital path. Details of the control valve 264 are shown more clearly with respect to FIG. 26. The pneumatic system also includes a rotary plate valve 265 for controlling the distribution of vacuum and compressed air to various portions of the apparatus during predetermined sections of the orbital path. The plate valve 265 is also shown in FIGS. 17, 18, 19 and 20. The interconnection between the plate valve 265, the control valve 264, the mandrel tilt angle control means 165, and the passageway 216 of the mandrel core 202 is most clearly shown in FIG. 20.

In describing the pneumatic system, reference will generally be made only to portions required for operating a single mandrel system, it being understood that equal provisions are required for the operation of each mandrel 140 on turret assembly 53. Referring to FIG. 27, in conjunction with FIG. 20, compressed air enters a passageway 266 through axle 172 by means of a rotatable fitting 267 (shown in FIG. 18) disposed on the through-extending end 177 of the axle 172. The passageway 266 extends to a point beyond the turret plate 170 and connects to radial drillings 268, only one being shown, in the flange 168 of axle 172. Radial drilling 268 extends radially outward and connects with conduit 270 which leads to control valve 264. Control valve 264 is also connected to conduit 263 leading into cylinder 250 for feeding compressed air to the cylinder 250 which holds the mandrel 140 radially outward. Control valve 264 is connected to conduit 233 on central portion 204 of core 202 which is used to detect the presence or absence of a cup 56 on the mandrel 140 and to control the operation of the control valve 264 during a portion of the orbital path of that mandrel.

FIG. 18 illustrates in greater detail the construction of plate valve 265. A nonrotating but floating stationary plate 271 is disposed adjacent a radial flange 272 extending from hub 169 and is prevented from rotating by a keying dowel 273. The rotating plate 274 of the plate valve 265 is formed by one side of the radially extending portion or flange 168 of turret plate 170. The stationary plate 271 is pressed into engagement with the rotating plate 274 by means of a plurality of pistons 275 within cylinders 276 which receive compressed air through radial drillings, indicated in FIGS. 18 and 27 by reference numeral 277, leading to an annular passageway 278 formed between stationary plate 271 and hub 169 by two spaced "o" ring seals 279 and 280. The annular passageway 278 receives compressed air from a conduit 281 through a radial drilling 282 as shown in FIG. 26. The opposite end of each piston 275 bears against radial flange 272 on hub 169. Stationary plate 271 has arcuate grooves 283 and 284 cut into its surface directed toward rotating plate 274. Conduits 285 and 286 extend through flange 271 and into grooves 283 and 284, respectively, in stationary plate 271.

Compressed air is fed to plate valve 265 by means of conduit 286 into groove 284 in stationary plate 271. A hole 287, cut into the rotating plate 274 of plate valve 265 at a point opposite groove 284 of plate 271, connects with radial drilling 288 which connects to conduit 223 leading to central portion 204 of core 202. In this manner, during a predetermined portion of the orbital path of each respective mandrel 140, compressed air is fed through section 220 of the passageway 216 in the manner described below.

In a similar manner, vacuum is drawn through conduit 285 connected to groove 283 in stationary plate 271 of plate valve 265 which extends around a portion of the orbital path of the turret assembly 53. A hole 289 cut into the rotating plate 274 at a point opposite groove 283 in plate 271 connects to radial drilling 290 in the rotating plate 274 of plate valve 265 which terminates in a conduit 215 which leads to central portion 204 of core 202. In this manner, vacuum is applied to respective mandrels 140 during a predetermined portion of their orbital path.

FIG. 26 illustrates one form of control valve 264 in which a reciprocating valve member 291 is disposed within a valve housing 292. The valve member 291 and the interior of the valve housing 292 are cooperatively contoured to form a plurality of chambers and valve seats. The upper end of valve member 291 is surmounted by a piston 293 disposed within an upper chamber or cylinder 294 in housing 292. A spring 295 is disposed in compression between the upper end of housing 292 and the piston 293 and is arranged to urge the valve member 291 in a downward direction. The conduit 233 from the central portion of core 202 leads into the upper chamber 294 between piston 293 and the upper end of housing 292.

An intermediate chamber 296 is present in valve housing 292, separated from upper chamber or cylinder 294 by a ring seal 297 about valve member 292 which contacts housing 292. The conduit 270 from radial drilling 268 leading to the passageway 266 connects to control valve 264 and enters chamber 296. Valve member 291 has a radially enlarged portion 298 within chamber 296 which forms an upper valve 299 with the lower portion of housing 292. Below valve 299 a bottom chamber 300 is formed in housing 292 by a portion of valve member 291 of lesser diameter. The valve member 291 is radially enlarged below bottom chamber 300 and forms a lower valve 301 with the bottom edge of housing 292. The conduit 263 leading to cylinder 250 connects to the control valve 264 into the bottom chamber 300 between upper valve 299 and lower valve 301. The valve member 291 has a through-extending lower end 302 which bears against a pivotably mounted arm 303 carrying a cam follower 304. The cam follower 304 rests upon a stationary cam 305, as shown in greater detail is FIG. 19.

In operation, during a portion of the orbital path, cam follower 304 in response to urging by stationary cam 305 holds valve member 291 in its uppermost position so that compressed air from conduit 270 entering cavity 296 within housing 292 passes through upper valve 299 which is open and into conduit 263 through the chamber 300. In this manner, compressed air is fed into cylinder 250 and presses piston 251 against base member 238, thus holding the mandrel 140 in its radially outermost position. In this position, the lower valve 301 is closed, preventing the passage of air from conduit 270 to atmosphere through the lower valve 301 thereby effecting its introduction into conduit 263.

As the turret assembly 53 carries a mandrel 140 through its orbital path, the cam follower 304 contacts another portion of the stationary cam 305 where it is allowed to move radially inwardly toward the rotational axis of turret assembly 53. This allows the valve member 291 to drop in response to urging of the spring 295 acting against the piston 293 surmounting valve member 291. The upper valve 299 is closed when the valve member 291 lowers thus preventing the passage of compressed air from conduit 270 into cylinder 250 through conduit 263. Instead, the compressed air within the conduit 263 and cylinder 250 is vented to atmosphere through the lower valve 301 which is now in its open position.

However, during this latter portion of the orbital path, the dropping of the valve member 291 is prevented if a cup 56 is present on the end of mandrel 140. Thus if a cup 56 is present on the end of mandrel 140, vacuum introduced through section 217 of passageway 216 by means of conduit 215 is also introduced through section 218 of passageway 216 and through conduit 233 which enters the upper chamber of cylinder 294. The vacuum thus introduced into the cylinder 294 overcomes the urging force of spring 295 and holds the piston 293 in its upper position. In addition, since the valve member 291 is retained in its uppermost position, the lower valve 301 is closed, the upper valve 299 is open, and the flow of compressed air into cylinder 250 is maintained which holds mandrel 140 in its radially outermost position. However, if a cup 56 is not present on mandrel 140, no vacuum is present to hold the valve member 291 in its uppermost position and mandrel 140 is moved radially inwardly accordingly.

From the above, it will be apparent that as long as cups 56 are regularly placed on successive mandrels 140, no movement of valve member 291 of control valve 264 occurs. Wear of valve 264 and mandrel tilt angle control means 165 is therefor kept at a minimum, contrary to what would be the case if movement were required for every cup printed. In addition, the control valve 264 is constantly ready to trigger withdrawal of a mandrel 140 radially inwardly toward the rotational axis of the turret assembly when a cup 56 has not been properly placed thereon. This avoids the printing of ink on the uncovered mandrel 140 and the subsequent transfer of such ink to the insides of following cups 56 placed on that mandrel.

4. Object Printing Apparatus

The object printing apparatus 51, disposed adjacent the object printing section 162 of the orbital path followed by mandrels 140 carried by the turret assembly 53 as shown in FIG. 1, is of particularly unique design and construction which enables the printing of a continuously moving arcuate surface similarly carried through an adjacent orbital path. Normally, when a surface is to be printed, a cylindrical printing cylinder is utilized which, during rotation, moves past one or more imaging or inking cylinders to receive the application of one or more printing fluids in the form of an image, and then moves past the surface to be printed, contacting that surface to form an image thereon. When the surface to be printed is arcuate, as is the surface of a cylindrical container, it must be held in a fixed position and allowed to rotate during printing since only one relative spatial position exists with two rotating cylinders in which line contact can be had between their cylindrical surfaces. The printing apparatus of the invention provides a means for obtaining a longer period of line contact between two rotating cylinders while both are being moved along orbital paths by altering the path of the contacting portion of the surface of one of the cylinders during printing to cause it to coincide with the path of the surface of the other cylinder. This arrangement allows continuous printing of cylindrical container sidewalls while the container is continuously moved through an orbital path, as distinguished from an indexed or intermittent operation. Several alternative embodiments of apparatus of the invention are described, each of which will enable printing of the surface of a cylindrical object such as a right cylindrical or a frusto-conical container sidewall while the container is continuously carried through an orbital path.

FIGS. 1, 28 and 29 show the preferred embodiment of object printing apparatus 51 in which a plurality of arcuate print blanket assemblies 310 are peripherally disposed about a shaft 311. Print blanket assemblies 310 are keyed to shafts 312 rotatably journaled upon bearing assemblies 313 and 314 carried in two spaced support plates 315 and 316 which are fixedly attached to shaft 311. Thus, support plate 316 is welded to shaft 311 and support plate 315 is attached by bolts 317 and 318 to shaft 311.

Print blanket assembly 310 comprises an arcuate print blanket 320 secured to a blanket support 321 keyed to shaft 312 and secured thereto by a bracket member 322 which surrounds and is attached to shaft 312 and is secured by bolts 323 and 324 to opposite ends of blanket support 321. Shaft 311 is rotatably journaled in a frame 325 by means of spaced bearing assemblies 326 and 327. The through-extending end 328 of shaft 311 carries a drive pulley 330 about which runs a toothed timing belt 331 (reference numeral 182 in FIG. 18) which connects drive pulley 330 and shaft 311 to drive wheel 181 on turret axle 172 connected to a motor (not shown). Drive pulley 330 is keyed to shaft 311. End 328 of shaft 311 also carries a drive gear 332 keyed thereto which drives a pinion gear 333, indicated in FIG. 29, which connects shaft 311 to the printing cylinders 334 so as to positively drive the printing cylinders 334 in relationship with the movement of arcuate print blankets 320 about the shaft 311. This drive interconnection is important both to insure accurate placement of images on print blankets 320 by printing cylinders 334 as well as to insure registration of one image created on print blanket 320 with another image on the same print blanket 320, especially where different colors are employed to create a composite image. Inking cylinders 329 are mounted adjacent each printing cylinder 334 and arranged to transfer ink or some other decorating material from a reservoir (not shown) to the surface of printing cylinders 334 in a manner well-known to those skilled in the printing art.

A cam support 335 secured to frame 325 by bolts 336 encircles shaft 311 and extends outwardly from frame 325 toward print blanket assemblies 310. Cam support 335 carries two radially outwardly extending cam flanges 337 and 338 which extend radially outward beyond cam support 335 for a predetermined variable distance about shaft 311 to control the pivotal movement of print blanket assemblies 310 on shafts 312 as they are carried through their orbital path about shaft 311 during printing. Thus, each shaft 312 has a through-extending portion 340 which extends beyond bearing assembly 314 and carries a pair of arms 341 and 342 which are clamped to shaft 312. Each of arms 341 and 342 carry rotatably mounted cam followers 343 and 344, respectively, on their ends, which follow camming flanges 337 and 338, respectively. During rotation of shaft 311 and movement of print blanket assemblies 310 about their orbital path, pivotal movement of arcuate print blanket assembly 310 in one direction is positively controlled or limited by arm 341 and cam follower 343 in response to the shape of camming flange 337. Pivotal movement of arcuate print blanket assembly 310 in the opposite direction is controlled or limited by arm 342 and cam follower 344 in response to the shape of camming flange 338. During printing, forces are impressed on the print blanket assembly 310 by contact between print blanket 320 and the sidewall of a cup 56 which tend to pivot it about shaft 312. The cam flanges 337 and 338 are conjugate cams which are matched to each other so that positive control of the pivotal movement of print blanket assemblies 310 is constantly maintained. This positive control system enables precise pivotal movement of arcuate print blanket assemblies 310 against dynamic and printing forces at high rotational speed of shaft 311 which enables the high speed printing of cylindrical or frusto-conical containers.

FIG. 28 illustrates the general relationship of the print blanket assemblies 310 relative to printing cylinders 334 and to the mandrels 140 carried by turret assembly 53 through their orbital path. FIG. 28 also illustrates the directions of rotation of the various portions of the apparatus. Thus, it can be seen that the turret assembly 53 carries mandrels 140 in a direction opposite to the direction of movement of the adjacent print blanket assembly 310. However, mandrels 140 are rotating in a counterrevolutionary direction to the rotation of turret assembly 53 after receiving rotational force from object rotate means 64 as they pass through the object rotate section 161 of their orbital path. Therefore, the portion of the surface of mandrels 140 and the surface of a cup 56 carried thereon moves in the same direction as the surface of the adjacent arcuate print blanket 320 of the printing apparatus 51. The object rotate means 64 serve to bring mandrels 140 up to a rotational speed where their surface velocity closely approximates the surface speed of the print blankets 320. Any small difference in surface speed between the mandrel 140 and the print blanket 320 is eliminated a short period after initial contact between them and before any printing has occurred.

As pointed out above, to avoid smearing the image transmitted by the print blanket 320 to the surface of the cup 56 carried on mandrel 140, it is important that the surface speeds of cup 56 be substantially equal to the surface speeds of print blanket 320. It has been found that when a frusto-conical surface is printed in this manner with a cylindrical print blanket 320, a difference in surface speed along the length of the cup 56 due to its tapered configuration, which can differ from the average surface speed by as much as 10 percent, does not result in noticeable smearing of the image. Any smearing which may occur can be minimized to some degree by the design of the image to be imparted as well as the type of printing fluid utilized. The image on the print blanket undergoes a predictable distortion which can be readily compensated for.

As pointed out above, where a frusto-conical object is to be decorated, the direction of inclination of the rotational axis of the object must be altered during the printing section 162 of its orbital path and specifically during that portion of its orbital path in which it is contacted by the print blanket 320. FIGS. 30 and 31 illustrate the operation of object printing apparatus 51 in conjunction with mandrel axis control means 65 of the turret assembly 53 during the printing of the sidewall of frusto-conical objects such as cups 56. The end 345 of the print blanket 320 nearest the approaching cup 56 is initially moved radially outwardly from the center of the shaft 311 in response to tilting of the arcuate print blanket 320 about its axis by the cam means. As the cup 56 advances in its orbital path, the tilted arcuate print blanket 320 contacts cup 56 and is slowly returned to its cylindrical position. Then, as the line of contact between print blanket 320 and cup 56 moves through a line between the rotational axis of turret assembly 53 and shaft 311, the trailing end 346 of the arcuate print blanket 320 is advanced radially outwardly and the cup 56 being printed begins to contact the last half of the arcuate print blanket 320. After contact with the cup 56 has been broken, the tilted print blanket 320 is pivoted back to its cylindrical position and moved into contact with the printing cylinders 334 again to replenish the decorating material or ink on its surface.

FIG. 30 shows the tilting action of the print blanket assembly 310 during the period of time when the surface of print blanket 320 contacts the surface of a cup 56 being carried through the printing section 162 of its orbital path. During this period of time, shaft 311 turns through an angle indicated by reference numeral 347 shown in FIG. 30, the turret assembly 53 turns through an angle indicated by reference numeral 349, and the center of curvature of arcuate print blanket 320 shifts from a point indicated by reference numeral 348 to a point indicated by reference numeral 350 in FIG. 31. Angle 349 represents the angle turned by turret axle 172 during the time the surface of a cup 56 contacts print blanket 320. Angle 349 comprises a portion 349a during which no printing occurs but the speed of a cup 56 and its carrying mandrel 140 are synchronized by frictional contact between the two, and a portion 349b during which printing of the cup 56 takes place.

As turret axle 172 turns about an angle indicated by reference numeral 351 in FIG. 30, the direction in which the rotational axis of mandrel 140 inclines is controllably altered by axis control means 65 as described above and is pointed in the direction of arrows 352 superimposed over mandrels 140 along the orbital path shown in FIG. 30. FIG. 31 shows how the inclined mandrel axis is directed toward the center of curvature of arcuate print blanket 320 as it shifts from point 348 to point 350 and as mandrel 140 is carried along its orbital path. Both preceding and following angle 351, the direction of inclination of the mandrel axis coincides with a radial line from the rotational axis of turret assembly 53 through the pivot axis of the mandrel 140.

Figure 32:
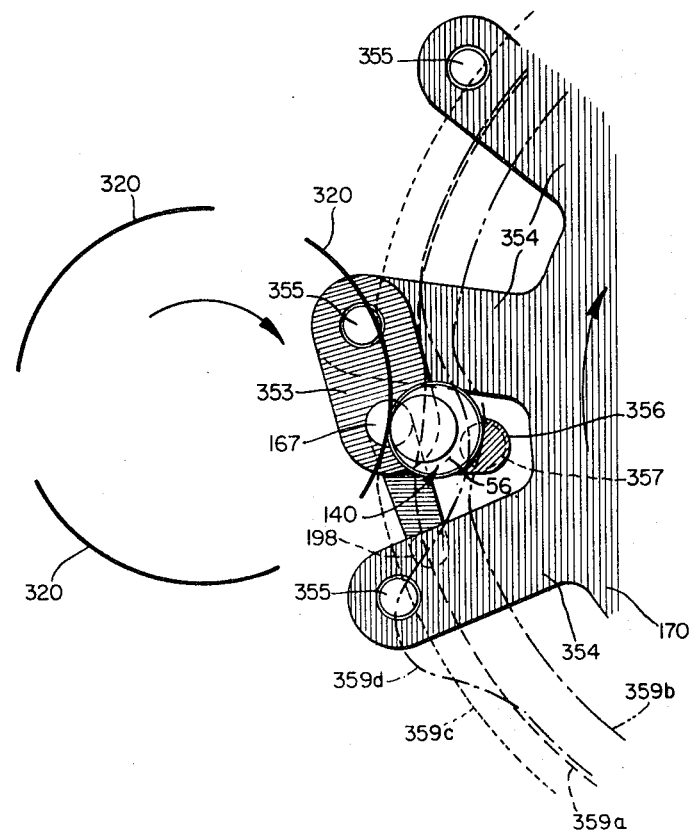
FIG. 32 is an elevation view of an alternative embodiment of a turret assembly of the invention.
Figure 33:
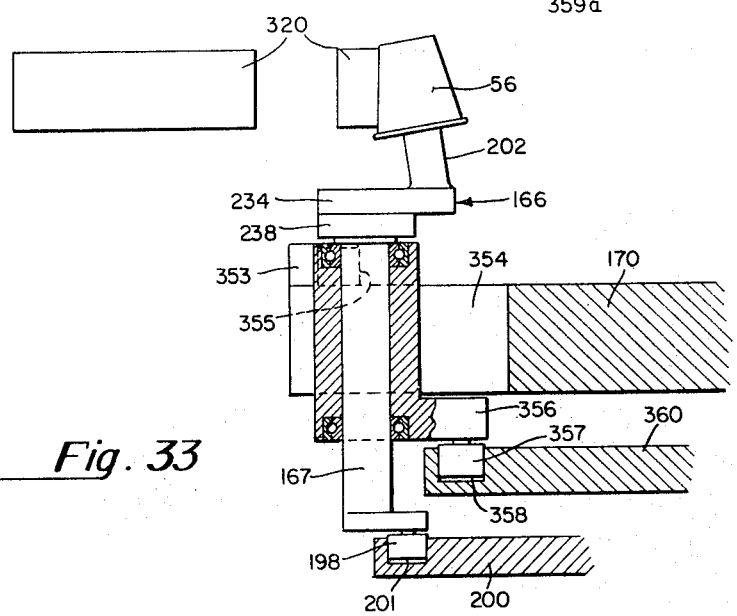
FIG. 33 is a sectional view taken along a plane intersecting the longitudinal axes of elements 167 and 357 in FIG. 32.

FIGS. 32 and 33 illustrate an alternative embodiment of apparatus enabling printing of a cylindrical or frusto-conical container sidewall while the container is continually moving through an orbital path. Turret assembly 53 is modified to permit radially inward motion of mandrels 140 toward axle 172 in a prescribed manner which enables the surface of a cup 56 carried on a mandrel 140 to follow the path of movement of a cylindrical print blanket 320 for a portion of its orbital path. Thus, mandrel 140 is pulled out of its circular orbital path and moved in a modified orbital path during the treatment section 162 of the orbital path. Shaft 167 carrying mandrel support assembly 166 is not carried directly on turret plate 170 but is rotatably carried in a member 353 which is pivotally attached at its other end to an extended portion 354 of turret plate 170 by means of a pin 355. Member 353 has an arm 356 affixed to one side thereof which carries a rotatably mounted follower wheel 357. Follower wheel 357 rides in a camming groove 358 cut into a swing frame cam 360 which is stationarily mounted upon hub member 169. Upon rotation of turret plate 170, mandrel 140 is moved radially inwardly in a predetermined manner due to movement of member 353 in response to action of cam follower upon swing arm 356 which rotates member 353.

FIG. 32 shows the paths various elements of the mechanism described above. Line 359a shows the path of the center of the bottom of a cup 56 carried on mandrel 140. As the cup passes adjacent printing cylinder 320, its path 359a is modified and moves radially inward toward the rotational axis of turret assembly 53. Line 359b shows the path of follower wheel 357 which determines line 359a. Line 359c shows the path of the pivot axis of shaft 167 and mandrel 140 while line 359d shows the path of cam follower 198 which pivots shaft 167.

It can be seen that shaft 167 is rotated by the action of cam follower 198 in camming groove 201 of camming plate 200 thereby changing the direction of inclination of the rotational axis of the mandrel 140 during the treatment section 162 of the orbital path. Alternatively, the above construction can be modified to provide sliding movement of the mandrel support assembly 166 radially inward and outward from the rotational axis of turret assembly 53 in a predetermined manner to cause it to follow the path of the print blanket during the treating section 162.

5. Object Removal Apparatus

FIGS. 35 through 38 illustrate a specific embodiment of object removal apparatus 52 shown in FIG. 1. Removal apparatus 52 performs the function of removing cups 56 from successive mandrels 140 carried by turret assembly 53 through the object removal section 163 of the orbital path. Since the cups 56 have decorating material on their exterior surface which generally is not dry or set prior to removal of the cup from mandrel 140, they must be handled through contact with portions other than the sidewall thereof. Removal apparatus 52 accomplishes handling of cups 56 to remove them from mandrels 140 by engaging the closed end of the cup 56 as well as the peripheral flange or lip extending radially outward from the exterior surface or sidewall of the cup.

Figure 34:
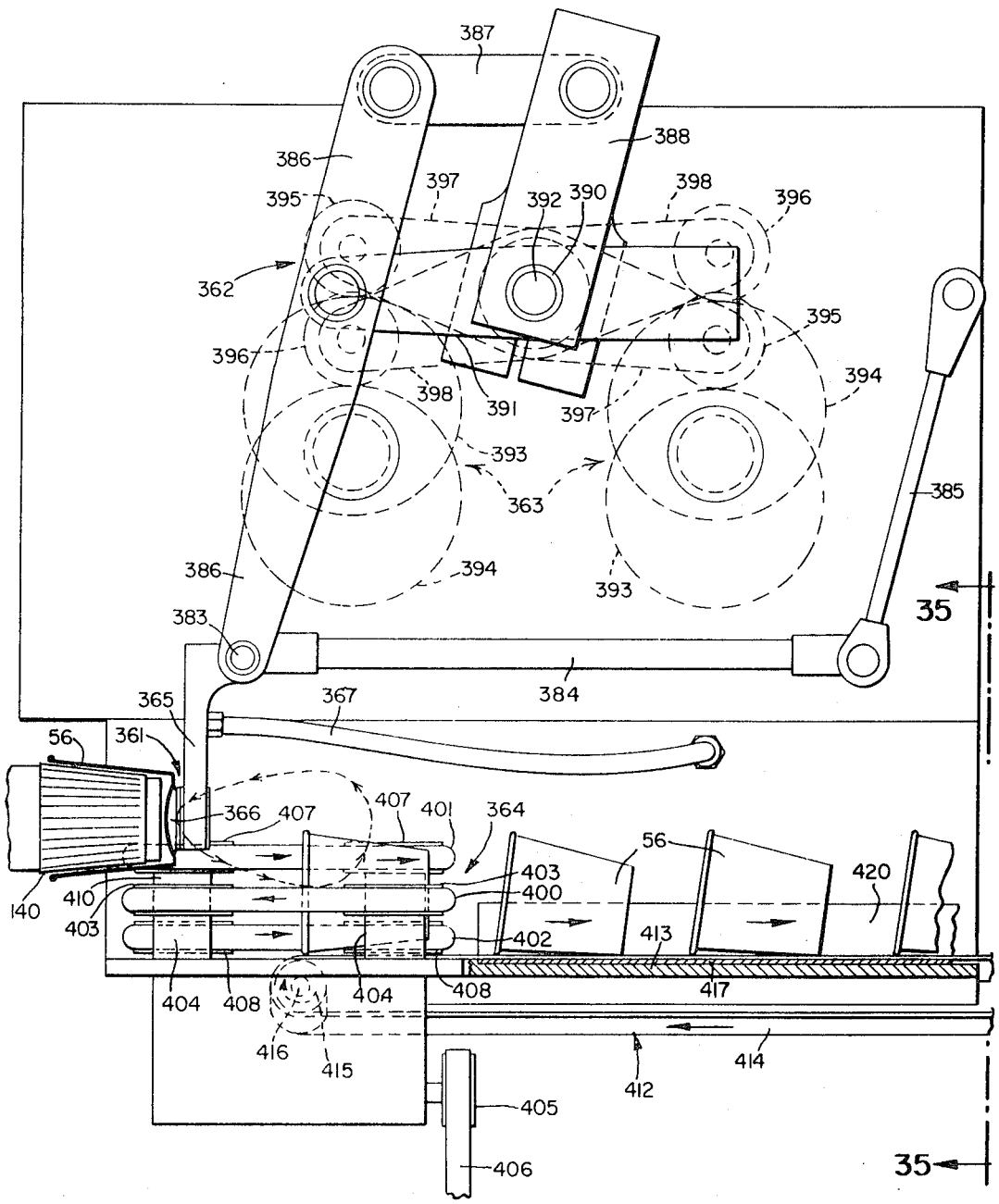
FIG. 34 is an elevation view of object removal apparatus of the invention, employed with the apparatus shown in FIG. 1.
Figure 35:
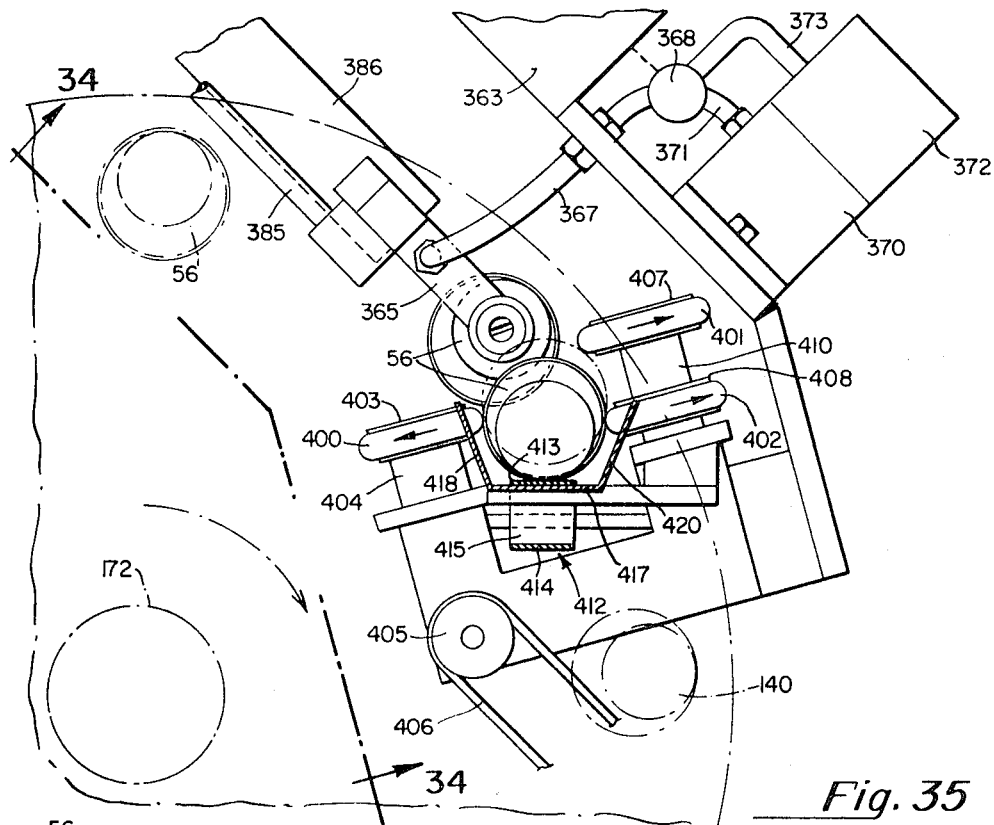
FIG. 35 is a sectional elevation view through the conveying means taken along line 35—35 of FIG. 34, FIGS. 36, 37 and 38 are progressive enlarged sectional elevation views through a mandrel illustrating sequential stages of object removal.

Referring now to FIGS. 34 and 35, a cup 56 is disposed upon a mandrel 140 which is carried by turret assembly 53 (described above) through an orbital path. Object removal apparatus 52 includes engaging means, indicated generally by reference numeral 361, which are moved through a prescribed path past removal section 163 of the orbital path by means of linkage means, indicated generally by reference numeral 362. The movement of linkage means 362 is controlled by actuating means 363 which, in the embodiment shown, comprise a cam system connected to a drive motor (not shown). Removal apparatus 52 also includes conveying means, indicated generally by reference numeral 364, which receive a cup 56 removed from mandrel 140 and transferred to a remote point by engaging means 361 operated by actuation means 363 through linkage means 362.

Engaging means 361 comprise a member 365 carrying a suction cup 366 on its lower end. A conduit 367 connects to member 365 and leads to a rotary valve 368 which connects to a vacuum pump 370 through conduit 371 and a compressor 372 through conduit 373. Rotary valve 368 is operably connected by drive means (not shown) to actuating means 363 to control its operation in timed relationship with movement of engaging means 361 so that a cup 56 is gripped by vacuum at a predetermined position and released by air pressure at another predetermined position.

Figure 36:
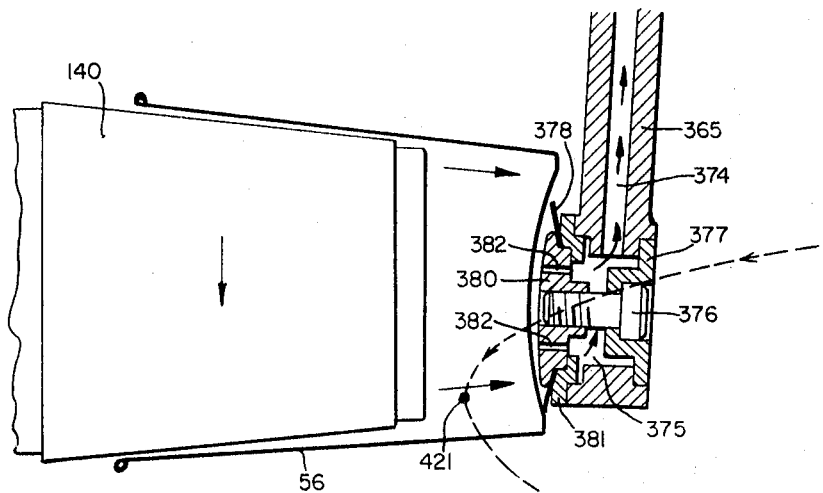
Figure 37:
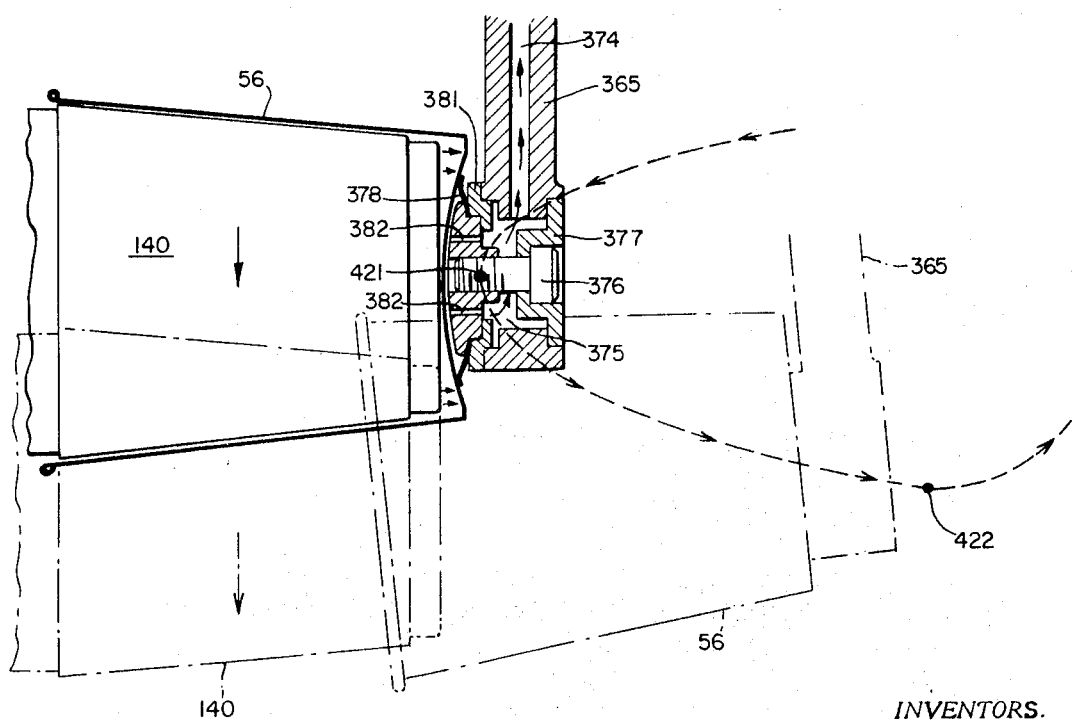

FIGS. 36 and 37 show the construction of member 365 and suction cup 366 in greater detail. Member 365 has a duct 374 extending downwardly from conduit 367 to an annular chamber 375 at its lower end. A bolt 376, bearing against a rear disk 377 retains a peripheral rubber seal 378 in position between a front disk 380 bearing against a seat 381. Front disk 380 has apertures 382 therethrough which connect chamber 375 with the space between the bottom of a cup 56 engaged by suction cup 366 and the outer surface of peripheral seal 378 and front disk 380. Upon creation of a vacuum in duct 374 through conduit 367, annular chamber 375 is evacuated and a cup 56 is engaged by suction cup 366 so that it can be supported thereby and removed from mandrel 140. Upon the addition of air pressure to annular chamber 375 through duct 374 and conduit 367, cup 56 may be disengaged from suction cup 366 at a predetermined time.

Member 365 is connected to a portion of linkage means 362 by a pin 383. Linkage means 362 includes an arm 384 which is an extension of member 365 and is pivotably connected at its opposite end to an arm 385 which is pivotably suspended from a fixed point at its upper end. Movement of arms 384 and 385 in response to actuation of other portions of linkage means 362 controls the direction of point of suction cup 366 which correspondingly controls the axial orientation of cups 56 carried thereby. In this connection, the suction cup 366 is preferably mounted on member 365 at a slight angle corresponding to the angle of inclination of mandrels 140 so that its periphery is equally spaced from the closed end of a cup 56 carried thereon.

Linkage means 362 also includes an arm 386 pivotally connected at its upper end to an arm 387 which is pivotably connected at its opposite end to a link 388 which is fixedly secured to outer shaft 390. A second link 391 is fixedly connected to an inner shaft 392 and also pivotably connected at one end to arm 386. Inner shaft 392 and outer shaft 390 are independently rotated through parts of one revolution in alternating directions so that the movement of pivotal member 365 can rapidly and accurately be controlled. Separate movement of inner shaft 392 and outer shaft 390 is achieved by the use of cams 393 and 394 (shown in phantom outline) operating through cam followers 395 and 396 rotatably attached to arms 397 and 398 fixedly attached at their centers to inner shaft 392 and outer shaft 390, respectively. By designing cams 393 and 394 to a predetermined configuration, the path of suction cup 366 can be accurately adapted and controlled to achieve a certain purpose with a motion path having particular velocity and spatial characteristics in a manner well-known to a skilled machine designer.

Conveying means 364 include a plurality of belts 400, 401 and 402, having a high surface friction characteristic which are arranged to grip the peripheral flange or lip of a cup 56 at spaced points about its periphery at a point where cup 56 has been at least partially removed from mandrel 140. For a short period of time and distance of travel, cup 56 is gripped both by suction cup 366 and by belts 400, 401 and 402. In the embodiment shown in FIGS. 34 and 35, belt 400 is carried in a pair of spaced pulleys 403 affixed to shafts 404 which are driven by means of gears (not shown) by a drive motor (not shown) connected to pulley 405 through a belt 406. Similarly, belts 401 and 402 are carried in pairs of spaced pulleys 407 and 408, respectively, mounted upon shaft 410, which are driven through drive means (not shown) by the same drive motor as above.

Another portion of conveying means 364 comprises a conveyor belt 412 running beneath a portion of the extent of belts 400, 401 and 402, and arranged to receive successive objects released by these belts and carry them to a remote position. Conveyor belt 412 has an upper flight 413 and a lower flight 414 and is suspended between a pair of spaced pulleys 415, only one being shown. Pulley 415 is carried on a shaft 416 connected to gears (not shown) which are driven by drive motor (not shown) acting through belt 406 upon pulley 405. The upper flight 413 of belt 412 runs over a supporting pan 417 having two upwardly diverging sides 418 and 420 which serve to guide cups 56 disposed therein in a predetermined manner and to orient them axially, with their open ends facing rearward of their direction of movement.

One of the features of belts 400, 401 and 402, is their adaptation to accurately place cups 56 into a position directly upon the surface of upper flight 413 of conveyor belt 412 so that they are supported by a point adjacent their closed end and a point on their peripheral flange or lip. This insures that decorating material on the exterior surface of cup 56 will not be contacted or smeared by carrying surfaces. It also insures that even at extremely high speeds of cup handling, no bouncing of the flexible cups will occur due to dropping the cups upon the moving surface when they are released by the belts 400, 401 and 402. It has been found preferable to transport cups 56 in a condition where they are tipped upon their side as they are more stable in this condition than when standing on either one of their ends.

Figure 38:
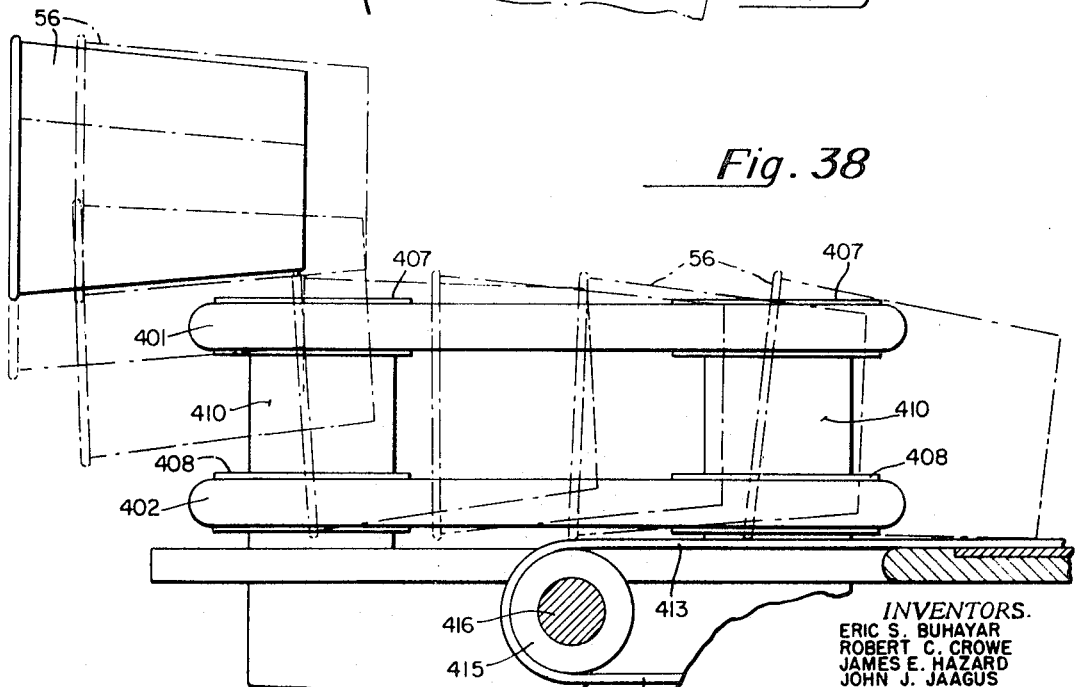

FIG. 38 illustrates the manner in which the axis of the cup 56 is oriented as the cup is gripped by belts 400, 401 and 402 to place the cup 56 in contact with the surface of upper flight 413 of conveyor belt 412. This is accomplished by having belt 401 run faster than belt 402 which is by the use of pulleys 407 of larger diameter than pulleys 408 so that both belts 401 and 402 may be driven of the same shaft 410. It may also be accomplished by use of gears.

FIGS. 36 through 38 illustrate the path followed by the suction cup 366 in response to movement by linkage means 362 operating actuation means 363. Although many motion paths could be constructed and utilized, some characteristics of the path of the suction cup 366 have been found important to the high speed removal of cups 56 from mandrels 140. The velocity of the suction cup 366 is continually changing about the orbital path to coincide at various points with the relative speeds of the other portions of the removal apparatus 52. For example, at the point indicated by reference numeral 421, the speed of suction cup 366 equals the speed of mandrel 140 along its orbital path and the speed in the axial direction of mandrel 140 is zero. At the point indicated by reference numeral 422, the speed of suction cup 366 in the direction of the orbital path of mandrel 140 is zero while it equals the speed of the conveyor belt 412 in the direction of the axis of cups 56. Between points 421 and 422, the suction cup 366 is rapidly accelerated and then decelerated to accomplish movement of cup 56 from mandrel 140 to belts 400, 401 and 402 as rapidly as possible and before mandrel 140 has traveled very far along its orbital path. Furthermore, the suction cup 366 must be returned to the pickup position fairly quickly to coincide with the next succeeding mandrel 140. However, it must be rapidly decelerated just prior to pickup of a cup 56 to facilitate engagement of the closed end of a cup 56 with suction cup 366.

As shown in FIG. 36, the suction cup 366 preferably encounters the cup 56 on mandrel 140 before suction cup 366 reaches the point indicated by reference numeral 421. This is arranged by disengaging and partially removing a cup 56 from mandrel 140 by the application of air pressure before mandrel 140 reaches the removal section of its orbital path. Premature complete removal is prevented by abutment member 164 shown in FIG. 1. Suction cup 366 then pushes cup 56 back toward mandrel 140 before withdrawing it therefrom. This allows more time for suction cup 366 to engage the closed end of cup 56 and insures positive gripping and removal which are important for continuity of operation of the printing apparatus.

6. Object Drying Apparatus

FIGS. 39 through 41 of the drawings illustrate a specific embodiment of object drying apparatus 54 of the invention, shown in FIG. 1. The terms "drying," "curing," and "setting" are used interchangeably throughout the specification and claims and are intended to include the treatment of decorating material, which may be an ink, a resinous composition, or other material, to transform it into a condition where it can be contacted without smearing. Referring to FIGS. 39 through 41, a conveyor belt 423 having an upper flight 424 and a lower flight 425 is stretched between a pair of tension rolls 426, only one of which is shown in FIG. 39. The tension roll 426 is rotatably attached at each end to spaced oppositely disposed frame members 427 and 428 extending along each side of the conveyor belt 423. The upper surface of upper flight 424 is a carrying surface to transport objects disposed thereon through the drying region of the dryer apparatus 54 in which wet or uncured ink or other decorating material is dried, cured or otherwise set. The lower flight 425 returns by passing beneath the frame. A plate 430 is disposed across each of the frame members 427 and 428 along the major portion of their length. The plate 430 serves as a bearing surface for the major portion of the length of the upper flight 424 of the conveyor belt 423. The objects contemplated for treatment in the dryer 54 are of such light weight that any friction created by movement of the belt 423 over the plate 430 is negligible. To eliminate any problem where heavier objects are involved, the upper surface of plate 430 might be coated with a friction reducing compound such as teflon or roller units might be substituted for the plate 430.

A feed conveyor 431, which in the specific embodiment shown is the conveyor 412 leading from the object removal apparatus 52, is arranged to feed objects such as cups 56 to a position adjacent the edge of the conveyor belt 423 near one end of the upper surface thereof as shown in FIG. 39. These conveyor belts 423 and 431 are moving at approximately the same speed and in the same direction.

A pair of guide rails 432 and 433 are disposed above the upper surface of the upper flight 424 of the conveyor belt 423 and travel generally along the conveyor belt 423 defining a path between them which is at an angle to the direction of travel of the conveyor belt 423. The guide rail 433 extends across the edge of the conveyor belt 423 and across the conveyor belt 431 feeding objects to the drying apparatus 54 and is adapted to transfer cups 56 from belt 431 to belt 423. The guide rails 432 and 433 are spaced from one another by a distance slightly greater than the diameter of cylindrical objects such as cups 56 to be treated in drying apparatus 54 and they are supported by brackets (not shown) affixed to the frame members 427 and 428. The feed conveyor 431 is adapted to feed cylindrical objects serially in an oriented condition so that the axis of the objects is generally aligned with the direction of movement of the conveyor belt 431. This general orientation is maintained by the guide rails 432 and 433 which serve to contact one edge of the object and to rotate it about its axis so as to roll it transversely across the carrying surface as it is carried through the ink curing region and transferred from the feed belt 431 to the carrying surface of the conveyor belt 423. Details of the rolling movement are shown in FIG. 41.

A plurality of heating sections 434 are disposed adjacent the guide rails 432 and 433 along each side of the ink curing region. The heater sections 434 comprise radiant heater units 435 disposed inside an insulated housing 436 attached by means of brackets 437 to the frame members 427 and 428. Blower means in the form of centrifugal fans 438 are provided behind each heater unit 435 and connected to the rear of the housing 436. The fans 438 are adapted to blow air at room temperature past the heating unit 435 where it is heated so that air at an elevated temperature is circulated over the surface of the rotating object such as cup 56 carried on belt 423. In addition, heater units 435 radiate heat toward the surface of the moving cups 56. To minimize heat loss from the drying apparatus 54 and to concentrate the heat uniformly over the surface of the cup 56, additional heat shields or baffles 440 are provided along the top edge of the housing 436. The baffles 440 may be constructed so as to be adjustable, thereby allowing them to be conformed to the shape required by a given object to be treated. The terminals of the radiant heaters 435 are connected to a suitable source of electric power (not shown). One function of the fans 438 is to cool terminals on the radiant heater units 435 since otherwise, heat built up inside the partially enclosed space would harm the insulation and create electrical problems. It has been found desirable in some instances to utilize a pump 441 to create a flow of water through the guide rails 432 and 433 to cool them during sustained operation of the drying apparatus 54.

FIG. 41 illustrates in greater detail the motion imparted to a cylindrical object such as a cup 56 having a frusto-conical shape and tapered sidewalls. The cup 56 is advanced by belt 423 into interference with guide rail 433 which exerts force against the radially extending flange and/or undecorated portions of the side wall near the closed end of cup 56. This causes cup 56 to rotate and to roll across the surface of upper flight 424 in a gradual controlled manner, thereby exposing its entire surface in a substantially uniform manner along the length of belt flight 424. The surface of the cup 56 containing the wet ink image is held above the carrying surface of belt 423 by the radially extending flange of the cup. It will be apparent that right cylindrical articles such as cans and the like may also be similarly treated by the drying apparatus described above.

What is claimed is:

1. A method for continuously moving hollow frusto-conical objects in supported condition through an object treatment process, comprising
   moving said objects continuously along a path through a treatment station,
   applying a rotational moment to said objects to cause them to rotate about their axes at a predetermined speed prior to movement through said treatment station, said rotation continuing through said treatment station,
   controllably varying the angular orientation of the rotational axis of each of said objects relative to said path as said objects are carried through said treatment station,
   whereby the portion of the exterior surface of the rotating object being treated which momentarily is nearest the treatment station is uniformly spaced therefrom along the length of said object as said object moves in rotation along said path.

2. A method according to claim 1, wherein said path is substantially circular.

3. A method according to claim 2, including moving said object through a portion of said path which is other than circular as it passes through said treatment station.

4. A method according to claim 1, including applying a vacuum between said support and at least portions of the interior surface of said hollow object prior to movement of said object through said treatment station so that said hollow object is securely held on said support during said treatment process.

5. A method according to claim 1, including applying pneumatic pressure to the interior wall and interior end of each of said hollow objects to aid in releasing said objects from their supported condition after movement of said objects through said treatment station.

6. A method for continuously moving frusto-conical objects through an object treatment zone where the exterior side walls of said objects are treated by prolonged contact with treating members rotating in a path adjoining the path of said objects, said method comprising the steps of:
   continuously moving said objects along a path which forms a circular arc passing through said treatment zone and allows said moving objects to have prolonged contact with said rotating treating members;
   rotating said objects about their axes during contact with said treating members at a treatment rotation speed sufficient to substantially prevent slip between said treating members and the portions of said objects in contact with said treating members; and
   controllably and continuously varying the angular orientation of the rotational axis of each of said objects relative to said path as said objects are carried through said treatment zone to cause contact between the rotating object being treated and the treating member to be along the full length of said object.

7. A method according to claim 6, including the step of rotating said objects about their axes prior to contact with said treating members at a speed closely approximating said treatment rotation speed.

* * * * *